United States Patent [19]

Pensabene et al.

[11] Patent Number: 4,686,013
[45] Date of Patent: Aug. 11, 1987

[54] ELECTRODE FOR A RECHARGEABLE ELECTROCHEMICAL CELL AND METHOD AND APPARATUS FOR MAKING SAME

[75] Inventors: Saverio F. Pensabene; Jon K. West; Robert A. Leclair, all of Gainesville, Fla.; Carl F. Van Conant, Traverse City, Mich.; Arthur J. Catotti, Gainesville; William L. Fralick, High Springs, both of Fla.

[73] Assignee: Gates Energy Products, Inc., Denver, Colo.

[21] Appl. No.: 839,669
[22] Filed: Mar. 14, 1986
[51] Int. Cl.⁴ .............................................. H01M 4/04
[52] U.S. Cl. ..................................... 204/2.1; 204/28; 204/32.1; 204/42
[58] Field of Search ....................... 204/28, 32.1, 35.1, 204/38.7, 42, 2.1

[56] References Cited

U.S. PATENT DOCUMENTS

| | | | |
|---|---|---|---|
| 2,727,083 | 12/1955 | Hollman et al. | 429/219 |
| 2,800,448 | 7/1957 | Fredenburgh | 204/300 |
| 3,074,857 | 1/1963 | Altenpohl | 204/28 |
| 3,222,128 | 12/1965 | Sooryn | 23/102 |
| 3,326,721 | 6/1967 | Henderson et al. | 204/2.1 |
| 3,400,056 | 9/1968 | Hills | 204/10 |
| 3,449,167 | 6/1969 | Keel et al. | 204/2.1 |
| 3,558,359 | 1/1971 | Jost | 204/2.1 |
| 3,585,119 | 6/1971 | Schneider | 204/181 |
| 3,630,781 | 12/1971 | Rampel | 427/126.6 |
| 3,813,327 | 5/1974 | Crowne et al. | 204/300 |
| 3,817,843 | 6/1974 | Barrett | 204/13 |
| 3,880,744 | 4/1975 | Idstein | 204/206 |
| 3,896,010 | 7/1975 | Vetter | 204/28 |
| 3,966,494 | 6/1976 | O'Sullivan | 429/222 |
| 4,169,780 | 10/1979 | Stiker et al. | 204/206 |
| 4,180,441 | 12/1979 | Stiker et al. | 204/2.1 |

FOREIGN PATENT DOCUMENTS

| | | | |
|---|---|---|---|
| 1078649 | 3/1960 | Fed. Rep. of Germany . | |
| 1131064 | 6/1962 | Fed. Rep. of Germany . | |
| 1133442 | 7/1962 | Fed. Rep. of Germany . | |
| 1958598 | 5/1971 | Fed. Rep. of Germany . | |
| 1023810 | 1/1953 | France . | |
| 39-2932 | 3/1964 | Japan . | |
| 41-5341 | 3/1966 | Japan . | |
| 49-36739 | 10/1974 | Japan | 204/2.1 |
| 50-66740 | 6/1975 | Japan . | |
| 50-132442 | 10/1975 | Japan . | |
| 50-136646 | 10/1975 | Japan . | |
| 51-25741 | 3/1976 | Japan . | |
| 51-87731 | 7/1976 | Japan . | |
| 52-61736 | 5/1977 | Japan . | |
| 948745 | 2/1964 | United Kingdom . | |
| 1251658 | 10/1971 | United Kingdom . | |
| 1296187 | 11/1972 | United Kingdom . | |
| 1376771 | 12/1974 | United Kingdom . | |
| 1429832 | 3/1976 | United Kingdom . | |
| 1551164 | 8/1979 | United Kingdom . | |
| 178257 | 2/1966 | U.S.S.R. . | |
| 200767 | 10/1967 | U.S.S.R. . | |
| 208278 | 2/1968 | U.S.S.R. . | |
| 344027 | 8/1972 | U.S.S.R. . | |
| 476336 | 10/1975 | U.S.S.R. . | |
| 384436 | 4/1976 | U.S.S.R. . | |

OTHER PUBLICATIONS

I. H. S. Henderson & S. G. Ladan, "The Preparation and Structure of Electrodeposited Sponge Cadmium Electrodes", 10/68, Canadian Journal of Chemical Engineering, vol. 46.

R. D. Armstrong & S. J. Churchouse, "Dendritic Growth of Cadmium in Relation to the Ni-Cd Cell", Electrochimica Acta, vol. 28, No. 2, pp. 185-190, 1983.

K. I. Popov & N. V. Krstajic, "The Mechanism of Spongy Electrodeposits Formation on Inert Substrate at Low Overpotentials", Journal of Applied Electrochemistry, 13 (1983), 775-782.

R. Barnard, G. S. Edwards, J. Holloway, F. L. Tye, Studies Concerning the Growth of Cadmium Dendrites, I. Morphology in Alkaline Media, and II. Morphology in Acid Media, Journal of Applied Electrochemistry, 13 (1983), 751-764 and 765-773.

Primary Examiner—T. M. Tufariello
Attorney, Agent, or Firm—C. H. Castleman, Jr.; H. W. Oberg, Jr.; F. P. Grassler

[57] ABSTRACT

A method and apparatus are provided for manufacturing an electrode for a rechargeable electrochemical cell by electrodepositing a metallic active material on a continuously moving metallic strip emmersed in an electrolytic bath containing an anode of the metal to be deposited. After depositing the metallic active material on the strip, the strip is passed through a second electrolytic bath wherein the metallic active material is at least partially oxidized.

83 Claims, 7 Drawing Figures

ELECTRODE FOR A RECHARGEABLE ELECTROCHEMICAL CELL AND METHOD AND APPARATUS FOR MAKING SAME

BACKGROUND OF THE INVENTION

This invention relates to electrodes for rechargeable electrochemical cells and more particularly to a new and improved negative electrode and a new and improved process and apparatus for making a negative electrode for a rechargeable electrochemical cell.

A negative electrode for a nickel-cadmium electrochemical cell may be made by a number of alternative processes known in the art. For example, the electrode may be made by a so-called sintered electrode process wherein a porous nickel carrier body is first sintered to a metallic current conducting substrate and then chemically impregnated with the active cadmium material involved in the electrochemical reactions of the cell during cell charge and discharge. Another alternative process for making a negative electrode for a rechargeable nickel-cadmium cell is commonly referred to as a pasted electrode process wherein the chemically active cadmium material is mixed with water and a binder to form a slurry or paste. The paste is spread directly onto the metallic current conducting metallic substrate and then dried.

Yet another alternative process electro-deposits cadmium directly onto a continuously moving strip of current conducting metallic substrate. The strip of material, with the cadmium deposited thereon, is then cut to size to form individual electrodes which are subsequently assembled into cells. One method of electrodepositing cadmium on a continuous metallic strip is described in U.S. Pat. Nos. 4,169,780 and 4,180,441. Briefly stated, these patents describe a process and machine wherein a negatively polarized continuous strip of metal is passed through a cadmium sulfate plating bath containing a positively polarized cadmium electrode. Current flow between the negatively polarized strip and the positively polarized cadmium electrode and through the plating bath is effective to disassociate cadmium ions from the cadmium anode and deposit cadmium metal on the negatively polarized continuous strip comprising the cathode.

The aforementioned sintered and pasted processes, which differ substantially from each other, have met with some success in producing electrodes found adequate for commercial nickel-cadmium cells. However, methods and apparatus, currently known in the art, for electro-depositing cadmium directly upon a continuous metallic strip have not proven to be entirely satisfactory in producing cadmium negative electrodes fully suitable for use in rechargeable nickel-cadmium cells. By way of example, one problem associated with electrodeposited cadmium negative electrodes made by the methods and apparatus known in the art arises from the fact that the continuous strip, and thus the electrodes, exit the electrodeposition machine and process in a fully charged state; that is, the active material on the negative electrode is in the form of cadmium metal. Yet, a rechargeable electrochemical cell when fully assembled and fully closed must have the state of charge of its positive electrode carefully matched in a predetermined relationship to the state of charge of its negative electrode. Matching of the states of charge is necessary in order for the closed cell to operate properly during subsequent charge and discharge cycles. Without careful matching of the state of charge of the positive electrode to the state of charge of the negative electrode, significant deficiencies in the subsequent performance of the cell may result. For example, initial charging of a closed cell having a fully charged negative electrode and a substantially uncharged positive electrode will cause electrolysis of the water comprising part of the electrolyte solution and the evolution of oxygen and hydrogen gases. As these gases are evolved, the internal pressure of the cell increases. When the pressure rises sufficiently to exceed the opening pressure of the cell's safety vent mechanism the safety vent will open and expel the gases and electrolyte droplets from the cell container. Thus, during initial charging of a closed cell, the quantity of electrolyte within the cell is reduced and the electrolyte remaining in the cell may be insufficient to enable the cell to achieve optimum operation and performance during subsequent charge and discharge cycles For this reason, then, when a fully charged negative cadmium electrode made by electrodeposition is assembled with a positive electrode at less than full charge, techniques known in the art provide for initially charging the assembled cell prior to final cell closure. That is, the cell is initially charged under conditions permitting the evolved gases to escape from the cell container. After initial charging has caused the positive electrode to reach a fully charged state, charging of the cell is terminated and then water is added to the cell to replenish that lost during the initial charge episode. This method of attaining a finally closed nickel-cadmium rechargeable cell is both time consuming and costly. The method introduces a separate, discrete manufacturing step after the cell has been assembled from its individual components. It consumes electrolyte during initial charging. Furthermore, because the amount of water lost during the initial charging episode may vary from cell to cell, the amount of water required for replenishment purposes will vary from cell to cell. Adding the same amount of water to each cell produced in high volume manufacture may result in performance deficiencies in at least a portion of the cell produced. Furthermore, it would be impractical to measure the amount of water lost by each cell in a production line for purposes of determining the amount of water required for replenishment of each cell. For all of these reasons, this technique for providing a finally closed cell is not entirely satisfactory.

Prior art techniques for electro-depositing cadmium on a continuous metallic strip for use in the manufacture of electrodes have been less than satisfactory for other reasons. It has been observed that nickel-cadmium cells assembled with an electro-deposited negative electrode have exhibited a condition commonly referred to as fade; that is, the capacity of the cell to deliver energy during discharge decreases with the number of repetitive charge/discharge cycles. This condition has been attributed to the tendency of cadmium hydroxide, which is the form in which the cadmium exists in the negative electrode when the cell is discharged, to dissolve to a slight degree in the liquid electrolyte within the cell. The cadmium hydroxide, while in the dissolved state in very low concentrations, may migrate from its initial location in the electrode. Eventually, for instance when the cell is charged, the cadmium may precipitate out of solution. If the dissolved cadmium hydroxide is in the separator material when precipitation occurs, the precipitated cadmium will reside in the separator. Over a number of repeated charge and discharge cycles, more and more cadmium is dislocated away from the electrode and into the separator. Dislocation of the cadmium in this manner diminishes the deliverable energy capacity of the electrode. Furthermore, dislocation of the cadmium from the electrode to the separator begins to form a conductive path through the separator from the negative electrode to the positive electrode. When the conductive path through the separator becomes well established, the positive electrode will be shorted to the negative electrode and the useful life of the cell will be at an end.

If, on the other hand, the dissolved cadmium is near another cadmium particle when precipitation occurs, precipitation may result in agglomeration; that is, a growth in the size of the cadmium particle which decreases the ratio of surface area of the cadmium particle to its volume. A decrease in this ratio reduces the accessibility of the electrolyte to the active cadmium material resulting in a reduction in the capacity of the cell to deliver energy.

With electrodeposition methods and machines known in the art, cadmium is deposited in crystalline form on a continuous strip of metal substrate. The cadmium coated strip is then cut into individual electrodes for assembly into a rechargeable electrochemical cell. The capacity for the electrochemical cell to deliver energy is very dependent upon the accessibility of the deposited cadmium to the electrolyte within the cell; that is to say, dependent upon the degree to which the deposited cadmium is utilized in the electrochemical reactions attendant the cell's charge and discharge cycles. This utilization capacity is expressed in terms of the number or fraction of milliampere hours of energy delivered per gram of cadmium hydroxide in the form of cadmium. The utilization capacity of an electro-deposited cadmium electrode is largely determined by the amount of cadmium in the electrode and the structure or form in which the cadmium is electro-deposited on the metallic electrode substrate. It is believed that deposition of the cadmium in the form of large crystals does not provide cadmium in a form sufficiently accessible to the electrolyte to effect optimum utilization. it is further believed that less than optimum utilization capacity results from the inability of the electrolyte to contact the cadmium deep within the crystalline structure. Prior art methods and machines have not been entirely successful in achieving optimum utilization capacity at least partly because of the inability to inhibit large cadmium crystal growth.

Good adherence between the electro-deposited cadmium and the continuous metallic substrate strip is an important consideration in the manufacture of an electrode for an electrochemical cell. Achieving good adherence during electrodeposition permits the electrode to be readily compatible with subsequent cell assembly operations without loss of cadmium particles for the substrate surface. In order for the electro-deposited cadmium electrode to be able to sustain high speed assembly and winding into a wound electrode assembly configuration, the bond between the cadmium particles and the substrate must be sufficiently strong to preclude the cadmium deposit from flaking from the surface of the substrate. Similarly, the electrode must be capable of withstanding the rigors of insertion into a cell container without peeling from the surface of the substrate. However, the surface of the continuous nickel-plated steel strip substrate often becomes contaminated with various substances such as oils, greases and surface oxides prior to electrodeposition of cadmium. These contaminants can adversely affect the bond between the continuous strip and the electro-deposited cadmium particles resulting in an electrode ill-equipped to sustain the rigorous handling associated with subsequent cell assembly and manufacturing operations.

As known in the art, processes and machines for electro-depositing cadmium on a continuous strip for use as electrodes in rechargeable electrochemical cells have been notoriously slow. That is to say the speed at which the strip moves through the electrodeposition plating bath and out of the electrodeposition machine is very slow. Among other factors, the amount of cadmium deposited on the strip is a function of the amount of time that the strip is in the electrodeposition plating bath and the current density at the interface between the strip's surface and the plating bath. This surface current density is defined as the current applied to the strip divided by the area of the strip exposed to the plating bath. To deposit the same amount of cadmium at a faster strip speed as would be deposited at a slower speed, the length of the electro-deposition tank must be increased while holding surface current density constant For example, holding surface current density constant and doubling the length of the deposition tank will permit the speed of the strip to be doubled, thus doubling the output of the machine, while still depositing the same amount of cadmium on the strip.

However, in prior art methods and machines, difficulties have arisen in maintaining the surface current density (as heretofore defined) constant as the length of the electrodeposition tank is increased beyond a certain limit. For all practical purposes, these difficulties limit the speed at which the strip may be passed through the electro-deposition tank without reductions in the amount of deposited cadmium. More specifically, maintaining current density constant as the length of the electro-deposition tank is increased is accomplished by increasing the current applied to the strip. Prior art machines have applied the current to the strip at a point just prior to entrance of the strip into the deposition tank. Thus, increases in current required to keep surface current density constant will increase the density of the current through the cross-section of the strip. For example, if the length of the tank is doubled, maintaining a constant surface current density will require a doubling of the cross-sectional current density. Doubling of the cross-sectional current density increases the heat generated in the strip. The additional amount of heat generated is the limiting factor of attaining advancement in the speed at which prior art processes and machines operate.

Accordingly, it is therefore an object of the present invention to provide an electrode suitable for a rechargeable electrochemical cell and a process and apparatus for making such an electrode.

It is another object of the present invention to provide an electrode for a rechargeable electrochemical cell by the electrodeposition of active material on a continuously moving metallic strip.

It is yet another object of the present invention to provide an electrode for a rechargeable electrochemical cell which, when assembled into a rechargeable electrochemical cell, is at a state of charge enabling the cell to be initially charged without causing the evolution of gases in quantities causing excessive pressure.

It is still another object of the present invention to provide an electrode for a rechargeable electrochemical cell by the deposition of active material on a continuously moving strip and to provide an electrode which, when assembled into the cell, is at a state of charge enabling the cell to be initially charged after the cell container has been sealed or closed.

It is yet another object of the present invention to provide an electrode for a rechargeable electrochemical cell by electro-depositing active material on a continuous moving strip wherein the electrode is resistant to migration and agglomeration of the active material during repetitive charging and discharging of the cell.

It is still another object of the present invention to provide an electrode for a rechargeable electrochemical cell by depositing active material on a continuously moving strip in a crystal size and configuration achieving improved electrochemical utilization capacity.

It is yet another object of the present invention to provide an electrode for a rechargeable electrochemical cell by depositing active material on a continuously moving strip in a manner achieving good adherence of the active material to the strip.

It is still another object of the present invention to provide a process and apparatus for achieving all of the aforementioned objectives.

It is yet another object of the present invention to provide a process and apparatus for manufacturing an electrode for a rechargeable electrochemical cell by electro-depositing active material upon a continuously moving metallic strip at speeds exceeding those heretofore known in the art.

SUMMARY OF THE INVENTION

Briefly stated, these and other objects of the present invention, which will become apparent from the following detailed descriptions and accompanying drawings are accomplished by the present invention which in one form provides for etching of a continuously moving metallic strip, electro-depositing active material on the moving strip by passing the strip through an electrolytic bath containing ions of the metal to be deposited, immersing a positively polarized electrode in the electrolytic bath, negatively polarizing the metallic strip, passing the metallic strip through the electrolytic bath while negatively polarized to effect deposition of the metal on the strip, providing a second electrolytic bath, immersing a negatively polarized electrode in the second electrolytic bath, positively polarizing the metallic strip after emergence from the first electrolytic bath and passing the positively polarized metallic strip through the second electrolytic bath to effect oxidation of the deposited metal. The first electrolytic bath may be comprised of a solution containing cadmium sulfate and nickel sulfate and may have a pH value well within the acidic range. After the aforementioned oxidation step, the moving strip with the active material deposited thereon may be coated with a non-conductive material permeable to the electrolyte in the cell and adapted to prevent migration of the deposited metal away from the metallic strip during charging and discharging of the electrochemical cell. The speed of the process and apparatus may be increased by negatively polarizing the metallic strip at the entrance and outlet of the first electrolytic bath. An inactive second positively polarized electrode may be immersed in the first electrolytic bath and may be comprised of a noble metal inactive electrode having its surfaces selectively polarized and passivated. Access of the moving strip to the first electrolytic bath may be achieved through an access slot adjacent a non-conductive ceramic insert comprised of a material chemically impervious to the first electrolytic bath. The negatively polarized electrode immersed in the second electrolytic bath may include a non-conductive insulator sleeve covering a selected portion of the electrode. The foregoing is but a brief description of but some of the features of the present invention and these and other features of the present invention are more fully described in the specification to hereinafter follow and are embraced by the appended claims.

BRIEF DESCRIPTION OF THE DRAWINGS

While the specification concludes with claims particularly pointing out and destinctly claiming the present invention, the invention will be more readily understood from the following descriptions of the preferred embodiment which are given by way of example with the accompanying drawings in which:

DESCRIPTION OF THE PREFERRED EMBODIMENT

Figure 1:
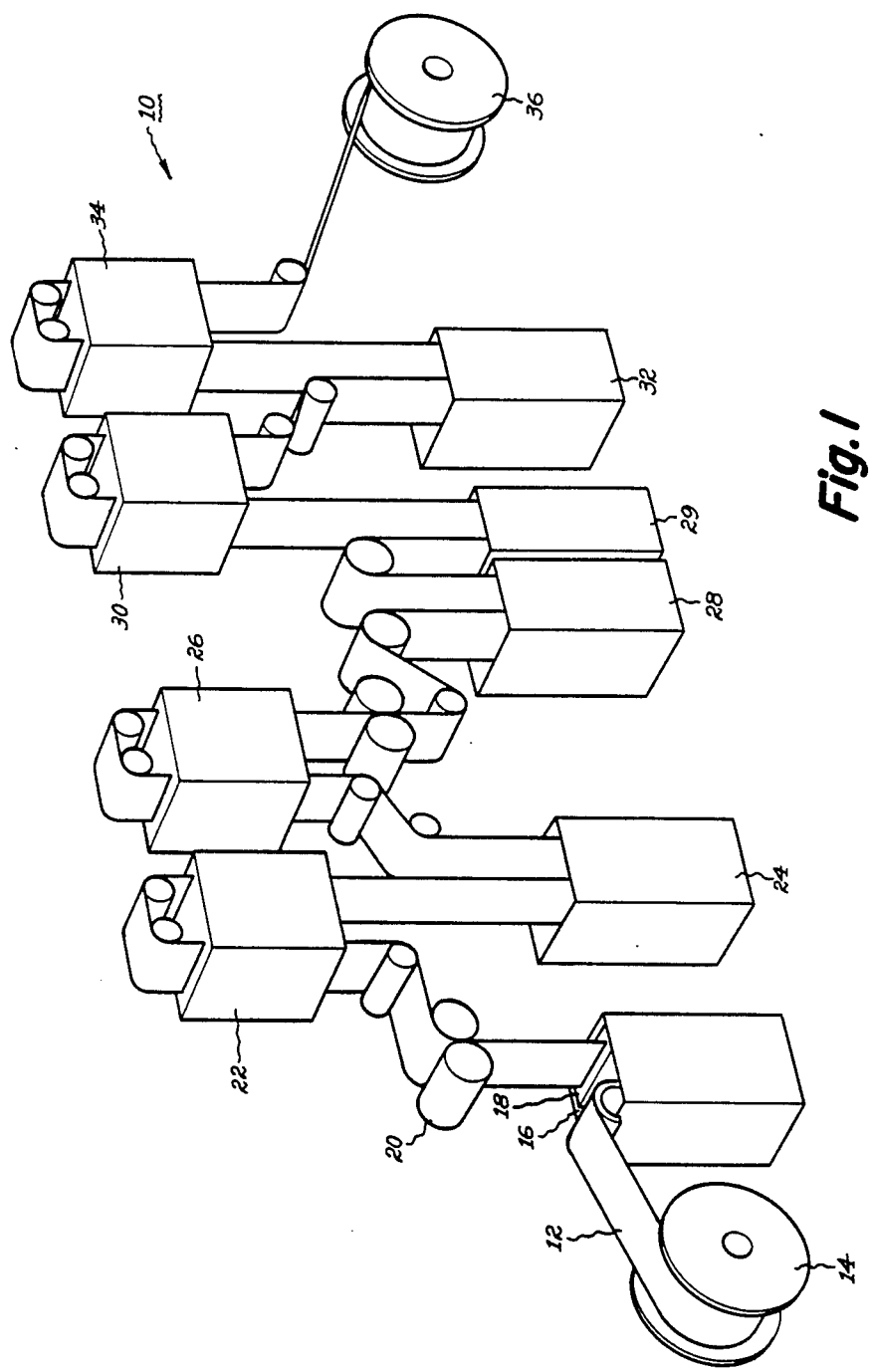
FIG. 1 is a perspective view of apparatus useful in carrying out the process for the manufacture of an electrode for a rechargeable electrochemical cell.

Referring now to FIG. 1, there is schematically depicted, generally at 10, a perspective view of a portion of the apparatus for practicing a process for manufacturing an electrode for use in a rechargeable electrochemical cell. The process of the present invention first comprises the step of etching a continuously moving continuous metallic strip 12, delivered from a payoff reel 14, in an etchant containing tank 16 to remove contaminants from the continuous strip. The process next comprises the step of electro-depositing the electrode active metal on the continuous metallic strip 12 by passing the etched metallic strip 12 through an electrodeposition tank 18 containing a first electrolytic bath having ions of the metal to be deposited. In one form of practicing the process of the present invention, the active metal deposited on the continuous metallic strip is comprised of cadmium metal. Upon emergence of the continuous metallic strip 12 from the tank 18, the process provides for the passage of the strip 12, with active cadmium metal adhered thereto, between a pair of calendaring rolls 20 to effect compaction or densification of the deposited active cadmium metal on the strip. Strip 12 with the compacted deposited metal adhered thereto, is then dried by passing the strip through dryer 22 and then passed through impregnation tank 24 and another dryer 26. At this stage of the process, the deposited cadmium metal is in the form of pure cadmium particles although some of the pure cadmium metal particles may have small amounts of cadmium sulfate and nickel sulfate residing on the surface thereof (due to the aforementioned impregnation step). In the pure form, the cadmium metal particles are in the so-called charged state; that is the state in which the particles reside in a fully charged nickel-cadmium rechargeable cell. In order to avoid the problems heretofore mentioned above in the subsequent assembly of the cadmium negative electrode with a nickel positive electrode into a nickel-cadmium cell, the strip 12 is thence passed through a second electrolytic bath contained in an electrochemical discharge tank 28. Passage of strip 12 through tank 28 oxidizes at least a portion of the active cadmium metal particles into cadmium hydroxide. Partial oxidation, in this manner, results in discharge of the active cadmium metal on the surface of continuous metallic strip 12. For example, for any given surface area of strip 12, if passage of the strip 12 through the tank 28 results in the conversion of fifty percent of the cadmium metal particles into cadmium hydroxide, then the state of charge of the strip in the given area is equal to fifty percent of the state of charge of the strip in the same area prior to passing the area through the electrochemical discharge tank 28.

Upon emergence of the strip 12 from tank 28, the process further includes the step of passing strip 12 through dryer 30 and thence through tank 32 wherein a thin coating of a non-conductive material permeable to the electrochemical cell electrolyte is applied to the cadmium metal and cadmium hydroxide residing on the surfaces of strip 12. The coating applied by passing strip 12 through coating tank 32 serves, after being dried in dryer 34, to facilitate assembly of the electrode into an electrochemical cell container. Application of the coating also serves to improve the cycle life of the cell by inhibiting the migration of cadmium throughout the cell during charging and discharging of the cell. Upon emergence of the strip 12 with the coating cadmium particles adhered thereto, the strip 12 is wound upon a take-up reel 36 from which strip 12 may later be unreeled for cutting into individual electrodes for assembly with other cell components to produce a nickel-cadmium cell.

Figure 2:
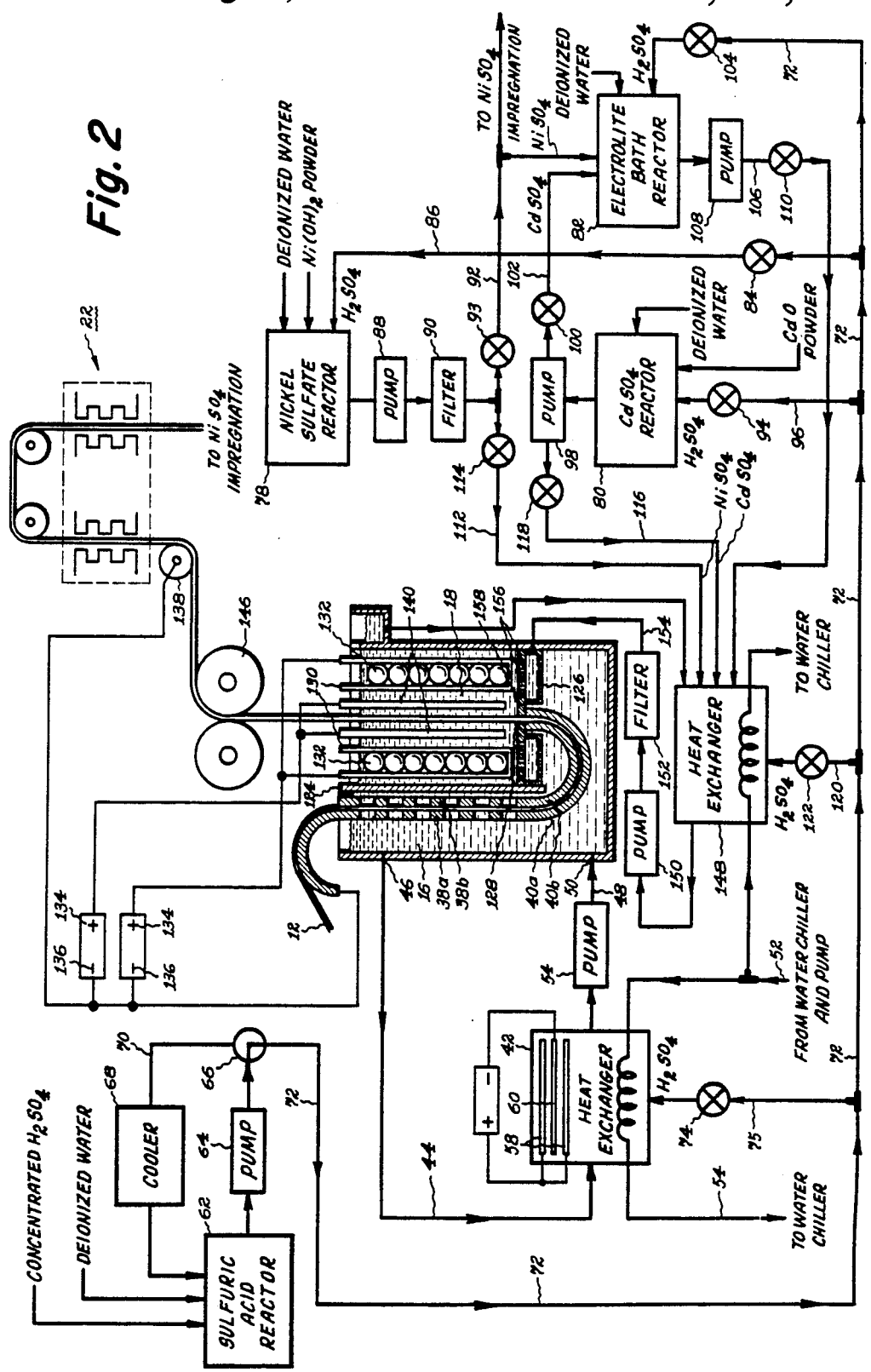
FIG. 2 is a schematic diagram of apparatus useful in carrying out the initial steps of the process in FIG. 1.

The apparatus and process of the present invention will now be described in greater detail. Referring first to FIG. 2, a portion of the apparatus shown in FIG. 1 for carrying out the process of the present invention is schematically depicted in more detail. As viewed in FIG 2, continuously moving strip 12 is supported by and between a pair of perforated support shoes 38a and 38b as strip 12 passes through etchant tank 16. Perforated support shoes 38a and 38b extend from the location of entry of strip 12 into etchant tank 16 to the location at which strip 12 exits etchant tank 16 and enters electrodeposition tank 18. As viewed in FIG. 2, perforated support shoes 38a and 38b extend vertically downward from the location of entry of strip 12 into etchant tank 16 thereby guiding the strip 12 downward in the vertical direction to the bottom of tank 16. At the bottom of etchant tank 16, shoes 38a and 38b each comprise a curved portion 40a and 40b, respectively, which curves 180° to orient strip 12 in the vertically upward direction to permit its passage through electrodeposition tank 18 in the vertically upward direction. Passage of strip 12 through electrodeposition tank 18 in the vertical direction is advantageous since the vertical orientation of the strip permits the gases generated during the electrodeposition step to escape from the surfaces of the strip 12. A horizontal orientation of strip 12 would tend to trap the gases on its underside.

Etchant tank 16 contains an etchant, which may be in the form of a 0.5 molar solution of sulfuric acid, for removing contaminants from the surface of strip 12 in preparation for the step of electrodeposition of metallic particles thereon. Passage of strip 12, while negatively polarized in a manner to be described, through the etchant in tank 16 results in the removal of contaminants from the surfaces of strip 12 prior to the subsequent electrodeposition step. Contaminant removal is effected by passage of the etchant through the perforations in support shoes 38a and 38b and into contact with the surfaces of strip 12. Contaminants thus removed from the strip pass into the etchant solution. Removal of the contaminants provide a clean surface to which the metallic particles deposited during the electrodeposition step may more readily adhere.

Continuous passage of strip 12 through etchant tank 16 would, unless preventative measures are taken, result in a build up of contaminants in the etchant solution and an increase in temperature of the etchant. Each of these conditions would have a deleterious affect. Therefore, for the purpose of permitting continuous operation of the process under optimum conditions, the process and apparatus are provided with means for continuously cooling the etchant, means for removing the contaminants from the etchant and means for continuously recirculating the etchant between the etchant tank and the contaminant removal means. More specifically, the apparatus provides etchant cooling means, in the form of heat exchanger 42, connected via fluid flow conduit 44 to fluid outlet 46 of etchant tank 16 and further connected via fluid flow conduit 48 to fluid inlet 50 of etchant tank 16. Heat exchanger 42 is further connected to a water chiller and pump (each not shown) via fluid flow conduits 52 and 54. Etchant recirculating means, in the form of pump 54, is disposed in fluid flow conduit 48 for the purpose of continuously recirculating the etchant between etchant tank 16 and heat exchanger 42 whereby the etchant is continuously cooled through the exchange of heat with the aforementioned chilled water. It is believed advantageous to provide design and control parameters for heat exchangers 42 and pump 54 which will introduce the etchant into the tank 16 at a temperature of about 10° C. at a flow sufficient to ensure that the temperature of the etchant while in the tank does not rise above a temperature of about 22° C.

As previously stated, the present invention provides means for removing the contaminants from the etchant in order that the process may operate on a continuous basis. More specifically, etchant contaminant removal means are provided in the form of a pair of positively polarized electrodes 58 and a negatively polarized dummy electrode 60 each immersed within the etchant solution within the confines of heat exchanger 42. Accordingly, as the etchant is continuously recirculated by pump 54 through the heat exchanger 42, passage of the etchant solution past the electrodes 58 and 60 is effective to cause the contaminants residing in the etchant solution to disassociate from the etchant solution and plate out on, or adhere to, a negatively polarized electrode 60. Positively polarized electrodes 58 may be comprised of any metal, such as titanium, resistant to etching by the etchant circulating through heat exchanger 42. Negatively polarized electrode 60 may be comprised of a suitable metal although low carbon stainless steel is preferred. Efficient removal of contaminants from the etchant may be effected by applying a current of approximately 500 amps at approximately 30 volts between the positive and negative electrodes 58 and 60 respectively.

Sulfuric acid reactor 62 provides a source of sulfuric acid for use in formulating the composition of the acid etchant in tank 16 and for use in formulating the composition of the electrolytic bath and other fluids used elsewhere in the process. Reagent grade 95% concentration of sulfuric acid is mixed with deionized water in sulfuric acid reactor 62 to provide a 5 molar solution of sulfuric acid. During such time periods as the operation of the process does not demand sulfuric acid for replenishment of working fluids or baths, the 5 molar solution of sulfuric acid is recirculated from reactor 62 through pump 64, valve 66 and cooler 68 and back to reactor 62 via circulating loop 70 to prevent the temperature of the system from becoming excessively high. When sulfuric acid is needed by the process, valve 66 is disposed in the position shown in FIG. 2 whereby the 5 molar sulfuric acid solution may be pumped by pump 64 via fluid flow conduit 72 to those portions of the process in need of sulfuric acid.

Sulfuric acid in conduit 72 may be admitted (after dilution with deionized water by means not shown) to heat exchanger 42 by opening valve 74 in conduit 75 communicating conduit 72 with heat exchanger 42. With valve 74 open tank 16 may be initially filled or replenished with etchant. When additional etchant is not needed by etchant tank 16, valve 74 is maintained in a closed position.

Sulfuric acid from reactor 62 is also selectively provided to nickel sulfate reactor 78, cadmium sulfate reactor 80 and electrolytic bath reactor 82 for purposes now to be described. Electrodeposition tank 18 effects deposition of cadmium particles on strip 12 by employing an electrolytic bath preferably comprised approximately of a 0.5 molar sulfuric acid, 0.15 molar cadmium sulfate and 0.0087 molar nickel sulfate solution. While these concentrations are preferred, it is believed that concentrations of sulfuric acid within the range of about $10^{-3}$ normal to about 10 normal, cadmium sulfate within the range of about 0.09 molar to about 0.3 molar and nickel sulfate within the range of about 0.0003 molar to about 0.01 molar may be used effectively to achieve the advantages of the present invention.

The electrolytic bath is formulated in the present invention by first formulating nickel sulfate in reactor 78 and cadmium sulfate in reactor 80 and then combining the nickel sulfate and cadmium sulfate with deionized water and sulfuric acid in electrolytic bath reactor 82. More specifically, 5 molar sulfuric acid is selectively conveyed past open valve 84 via fluid conduit 86 to nickel sulfate reactor 78 where the sulfuric acid is mixed with deionized water and nickel hydroxide powder to produce a 0.5 molar solution of nickel sulfate. The nickel sulfate solution is pumped from reactor 78 by pump 88 through filter 90 for the purpose of filtering contaminants out of the solution. The filtered solution is then selectively delivered via fluid flow conduit 92 past open valve 93 to electrolytic bath reactor 82.

Sulfuric acid from reactor 62 is also selectively delivered past valve 94 to cadmium sulfate reactor 80 via fluid flow conduit 96 where it is mixed with deionized water and cadmium oxide powder to produce a 0.5 molar solution of cadmium sulfate. The cadmium sulfate solution is then pumped by pump 98 past open valve 100 via conduit 102 to electrolyte bath reactor 82.

In addition to receiving the 0.5 molar solution of nickel sulfate via conduit 92 and the 0.5 molar solution of cadmium sulfate via conduit 102, electrolyte bath reactor receives deionized water and 5 molar sulfuric acid solution from conduit 72 when valve 104 is in an open position. After reactor 82 has received sufficient amounts of nickel sulfate, cadmium sulfate, sulfuric acid and deionized water to produce a quality of electrolyte bath comprising the composition heretofore mentioned valves 93, 100 and 104 are each respectively returned to the closed position and the constituents are agitated in reactor 82 until a thoroughly mixed and homogeneous solution of electrolyte bath is obtained. The electrolytic bath may then be pumped via conduit 106 by pump 108 past open valve 110 for admission to electrodeposition tank 18 in a manner hereafter to be described.

Electrolyte bath reactor 82 is of size sufficient to produce a batch quantity of electrolyte to initially fill electrodeposition tank 18 and its associated conduit lines, heat exchangers pump and filters. Once the system has been filled with electrolyte bath, reactor 82 may be used to produce a reserve batch of electrolyte which may be used to replace the previous batch should it become contaminated.

The process of the present invention also provides means for adjusting the concentration of the various constituents of the electrolyte bath residing in electrodeposition tank 18. To this end, nickel sulfate from reactor 78 may be directly admitted to the working electrolytic bath via fluid conduit 112 by selectively opening and closing valve 114 disposed therein. For a similar purpose, cadmium sulfate from reactor 80 may be directly admitted to the working electrolyte bath via fluid conduit 116 by selectively opening and closing of valve 118. Sulfuric acid may also be admitted to the working electrolyte bath via fluid conduit 120 by selectively opening and closing of valve 122.

In this manner then, the electrolyte bath supply system serves a dual purpose. First, the system provides means for supplying the electrodeposition tank with a batch quantity of electrolyte to fill electrodeposition tank 18 and its associated bath-containing components. Second, the bath supply system provides means for adjusting the concentration of the various constituents of the electrolytic bath residing in the electrodeposition tank.

As viewed in FIG. 2, etchant tank 16 is separated from electrodeposition tank 18 by a common vertical wall 124 and a horizontal wall 126. Horizontal wall 126 is provided with a rectangular slot 128 through which strip 12 may pass to gain entrance to electrodeposition tank 18. Immersed in the electrolytic bath in electrodeposition tank 18, are a pair of titanium mesh baskets 130. Each basket 130 contains a positively polarized electrode in the form of plurality of cadmium balls 132 comprising the metal to be electro-deposited upon the surfaces of strip 12 while it is passing through the electrolytic bath. One titanium basket 130 is disposed in tank 18 on one side of strip 12 closely adjacent to one surface thereof. The other basket 130 is disposed on the other side of strip 12 closely adjacent to the other surface thereof. Accordingly, strip 12 is sandwiched between the positively polarized electrode comprised of the cadmium balls 132 from which the cadmium metal will be deposited on strip 12. Titanium baskets 130 are each connected to a source of positive polarization 134 whereby the aforementioned positive polarization of the cadmium balls 132 is effected by engagement of the balls 132 with the baskets 130.

Strip 12 is negatively polarized while it is passing through electrodeposition tank 18 to effect deposition of the cadmium metal on strip 12. Negative polarization of strip 12 is accomplished in the present invention by negatively polarizing the strip 12 simultaneously at first and second location while strip 12 is passing through the electrolytic bath in tank 18. The first location is disposed proximate the entry of the strip 12 into the electrolytic bath and the second location is disposed after the strip 12 passes out of the electrolytic bath. More specifically, negative polarization of strip 12 simultaneously at two locations is accomplished by connecting a source of negative polarization 136 to the support shoes 38a and 38b which support strip 12 prior to its entry into the electrodeposition tank 18 and with which strip 12 is in current conducting engagement. Simultaneously, strip 12 is negatively polarized through engagement with polarizing roller 138 also connected to negative polarization source 136. Negative polarization of strip 12 at the two locations just mentioned provides a significant advantage over electrodeposition processes known in the art. With polarization at two locations, the entire current does not pass through any given cross-section along the length of the strip 12. Rather, only a portion of the total current passes through any given strip cross-section. Consequently, much less heat is generated during the electrodeposition process and the temperature of the strip 12 may be maintained at a lower value. Said another way, for any given temperature of the strip 12, simultaneous polarization of strip 12 at two locations permits a greater surface current density of strip 12 than can be achieved with polarization at a single location.

It is also important that negative polarization of strip 12 after it has passed out of tank 18 be accomplished after the densification of the deposited cadmium; that is to say, densification of strip 12 must be accomplished before the strip 12 is negatively polarized at the second location. The densification is accomplished at a third location disposed between the first and second locations at which strip 12 is negatively polarized. Otherwise, the contact pressure required between the strip 12 and the roller 138 to accomplish an effective electrical contact will displace the cadmium particles from uniform distribution over the surface of strip 12.

In addition to containing active anode 132, electrodeposition tank 18 contains inactive anode 140. Inactive anode 140 is disposed within the electrolytic bath in electrodeposition tank 18. More specifically, anode 140 is disposed on opposite sides of strip 12 and connected to source of positive polarization 134. Inactive anode 140 is provided in the apparatus and process of the present invention in order to compensate for differences between the efficiency at which cadmium is disassociated from the active anode 132 and the efficiency at which cadmium is deposited on the metallic strip 12. If the same magnitude of current were passed through the active anode 132 and the metallic strip 12, only approximately 80% of the cadmium disassociated from the active anode 132 would be deposited on the strip 12. Since the rate of cadmium disassociation at the active anode 132 and the rate of cadmium deposition on the strip 12 are both a function of current, process equilibrium is achieved by passing only a portion of the total current through the active anode 132 and the remainder of the total current through the inactive anode 140. Said another way, the amount of cadmium deposited on the metallic strip 12 can be made equal to the amount of cadmium disassociated at the active anode 132 by passing, through the active anode 132, only 80% of the total current passing through the metallic strip 12. The remaining 20% (approximately) of the total current is passed through the inactive anode 140. Of course, essentially 100% of the total current passes through the cathodic strip 12.

Figure 5:
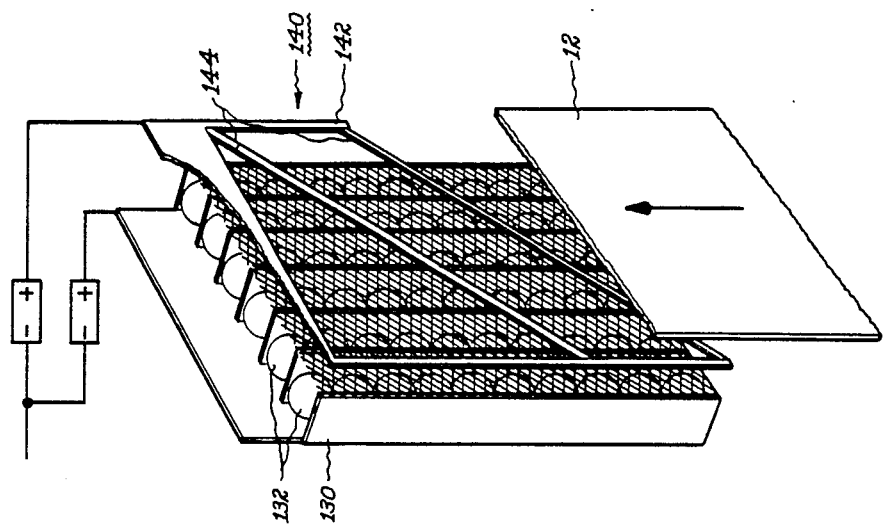
FIG. 5 is a perspective schematic view of the inactive anode depicted in FIG. 2.

Referring now to FIG. 5, there is depicted a schematic perspective view of one of the baskets 130 containing cadmium balls 132 comprising the active anode shown in FIG. 2. Also depicted in FIG. 5, is positively polarized inactive anode 140. Inactive anode 140 may be comprised of any noble metal but is preferably comprised of titanium. Use of inactive anodes comprised of lead, as known in the art, are not entirely suitable for the electrodeposition process of the present invention. For example, lead being relatively soft tends to deform under its own weight when fabricated into structures having a thin wall cross-section relative to the length and width of the structure. In order to maximize the output of electrodeposition tank 18, that is the output of strip 12 from tank 18 with cadmium metal deposited thereon, the length of tank 18 must be maximized to increase the residence time of strip 12 within tank 18. In a large tank 18, the inactive electrode 140 will normally have significant length and width and thus will tend to deform under its own weight if fabricated from lead as known in the art. In the present process this deformation makes it very difficult to control the critical spacing between the inactive electrode and the metallic strip 12. Lead also will tend to dissolve somewhat in the electrolytic bath resulting in contamination which may affect the electrodeposition process. Other metals, of course, are unsuitable because of their lack of resistance to corrosion in the acid environment of the electrolytic bath. For these and other reasons, it has been found to be necessary to provide an inactive electrode offering improved performance over the lead inactive anode known in the art.

Inactive anode 140 of the present invention is preferably comprised of titanium and includes a first surface portion which is selectively passivated, that is selectively anodized in a one normal solution of sulfuric acid to form an oxide coating thereon. Furthermore, the titanium in active anode 140 is selectively covered or plated with a relatively electrochemically inactive metal, such as platinum, on a second surface portion.

Referring again to FIG. 5, titanium inactive anode 140 is comprised of a perimeter portion 142 the surface of which has been passivated. The oxide layer on the surface of perimeter portion 142 will prevent the conduction of current between perimeter portion 142 and the electrolytic bath. Inactive anode 140 is also comprised of a central portion in the form of a pair of cross-bar members 144 that extend across the entire surface of strip 12. Cross-bar members 144 are also comprised of titanium. However, rather than having a passivated non-conductive oxide coating, the surface of members 144 are coated with a thin layer of a metal relatively electrochemically inactive with respect to the electrolytic bath. It has been found that a platinum coating having a thickness within the range of 150 to 180 micro inches is a satisfactory inactive metal for purposes of this invention. Cross-bar members 144, with the platinum coating on the surface thereof, provide the conductive surface of inactive anode 140 through which current may be exchanged with the electrolytic bath. As viewed in FIG. 5, cross-bar members 144 not only extend across the width of strip 12 but also extend in the vertical direction from the top to the bottom of active anode 132. Thus, inactive anode 140 is disposed between active anode 132 and strip 12 along the entire vertical extent of anode 132. Arrangement of cross-bar members 144 in this manner assures that current flowing between the platinized cross-bar members 144 of the inactive anode 140 and the electrolytic bath is distributed over the entire width and height of active anode 132. Thus, current from inactive anode 140 is continuously distributed across the entire electrodeposition interface between active anode 132 and strip 12; that is, from the bottom of anode 132 to the top of anode 132.

A titanium electrode, having a surface which is passivated and non-conducting and a surface which is platinized and conducting, offers a distinct advantage over lead anodes known in the art. Since it is necessary to distribute the current from the inactive anode 140 over the entire electrodeposition interface, the length and width of the inactive anode are relatively large with respect to its cross-section. The large length and width, of course, result in a large surface area which, unless passivated, is conductive. Passivation of the inactive anode 140 permits the size of the conducting surface area of inactive anode 140 to be controlled. In this regard, it is necessary for the conducting surface area of the inactive anode to bear substantially the same ratio to the conducting surface area of the active anode 132 as the ratio of the current through the inactive anode 140 bears to the active anode 132. Thus, partial passivation of the inactive anode 140 permits the anode to extend across the full width and length of the electrodeposition interface without introducing an excess of conducting surface.

Referring again to FIG. 2, as stated previously, the electrolytic bath is preferably comprised of a solution of approximately 0.5 molar sulfuric acid, 0.15 molar cadmium sulfate and 0.0087 molar nickel sulfate. The cadmium ion concentration of the electrolytic bath is held generally constant during continuous operation of the electrodeposition process by the division of current between active anode 132 and inactive anode 140 in the manner heretofore described. In practicing the process of the present invention, it is preferred to maintain the pH of the electrolytic bath within the range of approximately −0.2 to about 0.1. However, solutions with higher pH values within the acidic range are adequate, although not optimum, for practicing the present invention. Solutions having lower pH values also are adequate. In this regard, solutions having a pH within the range of about −1 to about 4 are believed to be adequate. Maintaining the pH within this approximate range insures that the electrolytic bath will serve as an efficient conductor of current without the addition of various additives. Furthermore, a solution having a pH value indicative of a substantially neutral solution changes the structure of the cadmium metal deposited on the metallic strip 12. More specifically, it is believed the deposited cadmium, for pH values in excess of the approximate range specified above, will not be in the form of the powdery fern-like deposit needed to achieve a ratio of particle surface area to volume sufficient to enable effective utilization of the active cadmium material during charge and discharge of the electrochemical cell. If the pH values are lower than the approximate range specified above, it is believed the electrolytic bath will be too acidic and the deposited cadmium will have a tendency to dissolve into the electrolyte.

The electrolytic bath, as stated above, is comprised of sulfuric acid, cadmium sulfate and nickel sulfate. The cadmium sulfate is provided in the electrolytic bath to provide an initial medium for the exchange of cadmium ions from the active cadmium electrode 132 to the continuous strip 12. It is believed that the presence of nickel sulfate in the electrolytic bath, in the small amounts specified, plays an important role in effecting deposition of powdery cadmium ferns of a size suitable for optimum utilization of the active cadmium material in the electrochemical reactions occurring during charge and discharge of the electrochemical cell. Without the addition of the minute amount of nickel sulfate to the electrolytic bath, powdery cadmium ferns are deposited on the strip 12 in a size in which the ratio of surface area to volume is too small to achieve optimum utilization of the active cadmium material during cell operation. In other words, the ferns of cadmium are too large. However, with the addition of nickel sulfate, the deposited cadmium ferns are of smaller size thereby increasing the surface area to volume ratio and improving utilization of the deposited active cadmium material. It is believed that this occurs because small amounts of nickel are co-deposited with the cadmium on the strip 12 in a manner which terminates the crystal growth of the cadmium ferns. Thus, the nickel limits the growth of the cadmium ferns to a size which does not adversely affect utilization. It has been found that a preferred ratio of the amount of cadmium to nickel in the electrolytic bath of approximately 37 to 1 by weight achieves the deposition of cadmium in the form of ferns of a size providing excellent utilization. It is believed that ratios of the amount of cadmium to nickel in the electrolytic bath within the range of from about 12 to 1 by weight to about 337 to 1 by weight will also prove adequate although not perhaps optimum.

The addition of the small amount of nickel sulfate to the electrolytic bath and the subsequent co-deposition of small amounts of nickel on strip 12 also appears to have other advantages. The presence of nickel on the metallic strip 12 appears to improve the conductivity of the active material during operation of the electrochemical cell. The presence of nickel also appears to retard migration of the cadmium and agglomeration of cadmium particles during operation of the cell. It is believed that when a small portion of the cadmium dissolves in the cell electrolyte during discharge of the cell, the nickel retards displacement of the cadmium to other areas of the cell such as the separator. It is further believed that the nickel provides multiple sites for the growth of cadmium crystals when the cell is recharged and the cadmium is precipitated out of the electrolyte. The availability of multiple sites tends to preclude the recrystalization in the form of large or aggomerated particles.

Referring again to FIG. 2, the strip 12, negatively polarized by virtue of its contact with support shoes 38a and 38b and with contact roller 138, is continuously passed through etchant tank 16 where contaminants on the surface of strip 12 are removed into the etchant and the surfaces are slightly etched to provide sites for adhesion of the cadmium deposited in tank 18. Support shoes 38a and 38b provide for guiding of strip 12 through tank 16 and for orienting the strip 12 for entrance into electrodeposition tank 18 through entrance slot 128. Electrodeposition tank 18 contains an electrolytic bath having ions of cadmium metal to be deposited in which is immersed positively polarized electrode 132 comprised of the cadmium metal to be deposited. As metallic strip 12 is passed through tank 18 and thus through the electrolytic path. Cadmium metal from anode 132 is deposited upon the surfaces of strip 12 as powdery fern-like crystal growths. Upon emergence from tank 18, strip 18 with the cadmium metal (and small amounts of nickel metal) is passed through densification or consolidation means in the form of electrically-isolated calendaring rolls 146. Densification or compaction of the cadmium powder on strip 12 provides the powder with improved structural integrity to permit sufficient pressure contact with electrical contact roller 138 to establish an efficient electrical contact. Upon passing contact roller 138 the strip is passed through dryer 22.

In order to enable the process of the present invention to operate continuously, the electrolytic bath in electrodeposition tank 18 must be continuously filtered and cooled. This may be accomplished by an electrolytic bath circulation system comprising heat exchanger 148, pump 150 and filter 152 each disposed serially in fluid flow conduit 154. Conduit 154 conveys electrolyte overflowing tank 18 directly to heat exchanger 148 where the bath is cooled from a temperature of approximately 22° C. to a temperature of approximately 12° C. The cooled fluid is then pumped by pump 150 through filter 152 where cadmium particles that may have become suspended in the bath, are removed. The bath fluid is then conveyed by conduit 154 to tank 18 where it passes through a plurality of parallel channels 156 disposed in laminar flow inducing means or plate 158.

Figure 6:
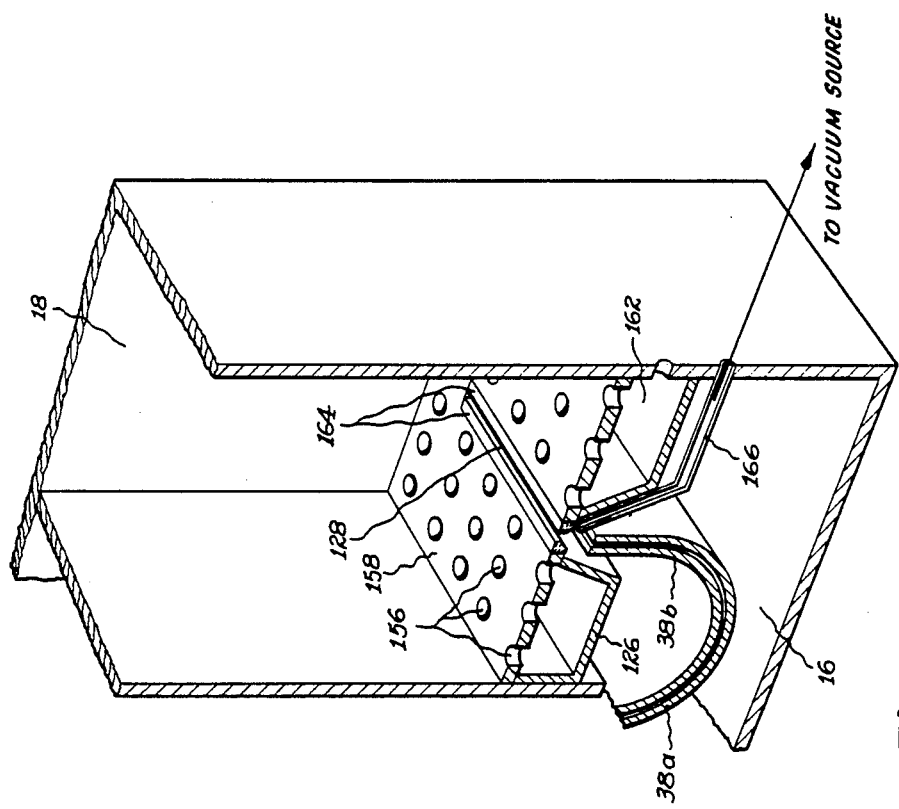
FIG. 6 is a partially cutaway schematic view of a portion of the electrodeposition tank depicted in FIG. 2.

Referring now to FIG. 6, there is depicted an enlarged schematic view of the lower portion of electrodeposition tank 18. Laminar flow inducing means in the form of member or plate 158 is disposed at the lower end of tank 18 and spaced apart from the bottom wall 126 of tank 18 to form a cavity 162 disposed therebetween. Cavity 162 receives the cooled electrolytic bath from pump 150 and distributes the fluid to the plurality of parallel flow channels 156 for passage therethrough to provide for upward flow of fluid in a plurality of parallel streams. Plate 158 contains access slot 128 through which the strip 12 may pass from etchant tank 16 into electrodeposition tank 18. Carried or supported by plate 158, heat resistant means in the form of a pair of heat resistant ceramic inserts 164 are disposed immediately adjacent slot 128 and in very close proximity to the surfaces of continuously moving strip 12. Ceramic inserts must be positioned extremely close to the surfaces of strip 12 in order to minimize the flow of fluid between etchant tank 16 and electrodeposition tank 18. Since the cooled electrolytic bath serves to cool the strip 12, however, minimizing the flow of fluid between tanks 16 and 18 by positioning inserts 164 closely adjacent strip 12 results in less cooling fluid contacting the strip 12 at the location of slot 128. Hence, the temperature of the strip 12 at the slot 128 is significantly higher than at other locations within the tanks 16 and 18. For this reason, inserts 164 should be comprised of a heat resistant material having a low coefficient of expansion to avoid clearance variations between the inserts 164 and the strip 12. In addition, the inserts must be comprised of a material which is non-conductive and chemically impervious to the electrolytic bath in tank 18 and to the etchant in tank 16. By impervious is meant that the inserts must be so inert so as not to introduce even trace amounts of ions or particles into the electrolytic bath. It has been found that inserts 164 comprised of a machineable ceramic material, such as that sold under the tradename of Macoor by Dow Corning Company are particularly suitable for purposes of carrying out the present invention.

The length of slot 128 in the direction of travel of strip 12 should be kept to a minimum. In this regard, the length of the slot 128 should be just long enough to prevent significant flow of etchant into the electrodeposition tank 18. A slot of greater length will result in a high strip temperature at the slot because the slot prevents cooling fluid (the etchant) from contacting the strip 12.

The high temperature of strip 12 proximate slot 128 may be sufficiently high to vaporize the water contained in the electrolytic bath thereby producing steam. It is also believed that the electrolysis of the water in the electrolytic bath may occur in the location just beneath slot 128 thereby producing hydrogen and oxygen gases. Since, the clearance between inserts 164 and strip 12 are maintained at a minimum, the hydrogen and oxygen gases may be substantially trapped beneath the slot 128. The trapped gases can prevent the cool electrolytic fluid from fully contacting the strip 12. Accordingly, the strip 12 may not be optimally cooled at the location immediately below the slot 128. In order, to permit the removal of oxygen and hydrogen gases, the present invention provides gas removal means in the form of gas conveying conduit 166 communicating the location immediately beneath or upstream of entrance slot 128 with a source of reduced pressure or partial vacuum whereby the oxygen and hydrogen gases may be removed or drawn away from the location immediately beneath slot 128. In this manner then, oxygen and hydrogen gases are removed and strip 12 may be effectively cooled by the electrolytic bath at the location immediately beneath entrance slot 128.

As stated above, the clearance between ceramic inserts 164 and continuously moving strip 12 is maintained at a minimum in order to minimize the flow of fluid between tanks 16 and 18 through slot 128. Since strip 12 must slide through entrance slot 128, however, some clearance is necessary in order to prevent the strip 12 from binding with ceramic inserts 164. Since some clearance is necessary, some fluid will be exchanged between tanks 16 and 18. It has been found advantageous to provide means for ensuring that fluid will always flow from etchant tank 16 into electrodeposition tank 18. Flow in an opposite direction would introduce cadmium sulfate and nickel sulfate into the etchant tank 16 causing the deposit of cadmium metal on strip 12 within the etchant tank 16. Such deposition would increase the overall thickness of the strip 12 and cause difficulty in the passage of strip 12 through the entrance slot 128. Thus, means for providing for the continuous flow of fluid from etchant tank 16 to electrodeposition tank 18 are provided by making the height or head of the etchant fluid in tank 16 greater than the height or head of the electrolytic bath fluid in electrodeposition tank 18. Thus, etchant will always flow from tank 16 to electrodeposition tank 18. Since the flow of etchant in this direction is at very low rates, the composition of the electrolytic bath may be readily maintained by the addition of cadmium sulfate and nickel sulfate as needed through conduits 116 and 112, respectively.

Figure 3:
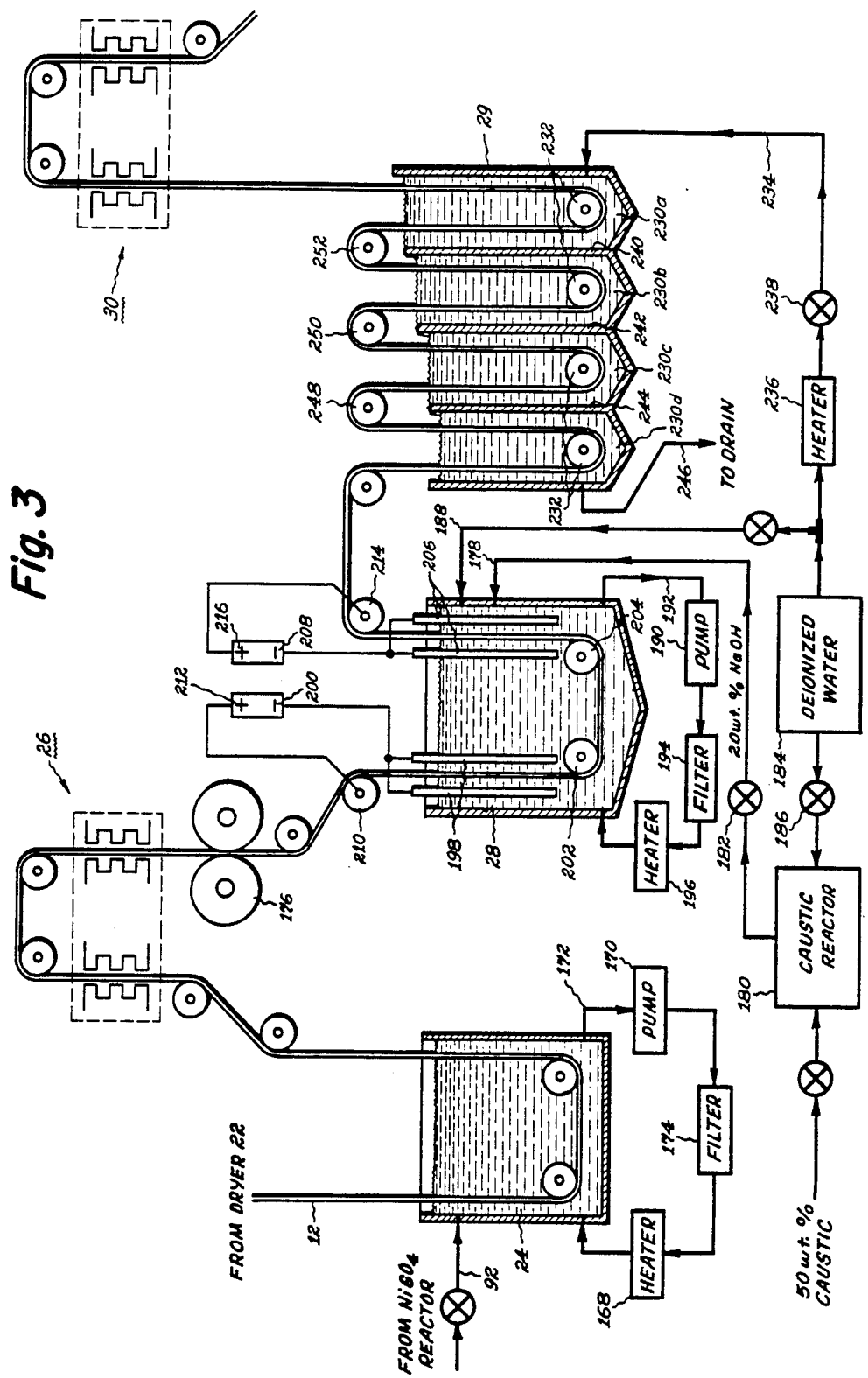
FIG. 3 is a schematic diagram of apparatus useful in carrying out process steps subsequent to those depicted in FIG. 2.

Referring now to FIG. 3, strip 12 with cadmium metal deposited thereon is directed from dryer 22 into impregnation tank 24 containing a nickel sulfate solution having a nickel sulfate concentration within the range of from about 0.2 molar to about 1 molar and preferably about 0.5 molar maintained at a temperature within the approximate range of 20 degrees C. to 30 degrees C. by heater 168. The nickel sulfate solution is introduced into tank 24 via conduit 92 and, once within tank 24, is recirculated by pump 170 through fluid flow conduit 172, filter 174 and heater 168. As strip 12 enters impregnation tank 24, the strip 12 carries deposited cadmium particles, some of which have been coated with nickel. Since the strip 12 emerged from tank 18 with droplets of electrolyte thereon, drying of the strip 12 by dryer 122 also results in particles or solids of cadmium sulfate being carried by the strip 12 prior to immersion in impregnation tank 24. Impregnation of strip 12 in impregnation tank 24, causes more of the cadmium particles to be at least partially coated with a thin layer of nickel sulfate. The impregnation step of the present invention is necessary in order to achieve a number of desireable effects or advantages in the performance of the cell in which the electrodeposited electrode is used. Principally, nickel sulfate impregnation serves to reduce migration of the cadmium from the electrode to other components of the cell during discharge and charge of the cell. It is also believed that nickel sulfate impregnation reduces the fade (decrease in deliverable energy with cell useage) by reducing the aforementioned tendency of the cadmium to agglomerate into large particles during charge and discharge cycles.

The amount of nickel deposited on the cadmium particles is dependent upon the residence time of the strip within the tank 24. Since the process of the present invention achieves more advantageous results and efficienies if continuous, the speed of the strip 12 must be the same through tank 18 and 24. Thus, for a given strip speed the residence time of strip 12 within tank 24 is set by selecting the size of tank 24 to provide a path of travel through the tank 24 of sufficient length to provide the desired residence time. For example, residence times approximately within the range of 3 to 7 minutes have been found to provide sufficient time for the desired amount of impregnation.

Upon emergence from tank 24, strip 12 carries cadmium particles some of which are partially coated with nickel and also carry a solution containing both cadmium sulfate and nickel sulfate. Thereafter, passage of strip 12 through dryer 26 is effective to convert the cadmium sulfate and nickel sulfate in the solution into solid form. Upon emergence from dryer 26, strip 12 is passed through a pair of sizing or calendaring rolls 176 whereby the strip 12 with the deposits thereon are sized to a desired thickness. The calendaring rolls 176, like the calendaring rolls 146, also serve to pull or advance the strip 12 through the process comprising the present invention.

Electrochemical discharge tank 28, as previously stated, serves to discharge the cadmium on strip 12 by converting at least a portion of the cadmium particles to cadmium hydroxide. For this purpose, discharge tank 28 may contain a second electrolytic bath or fluid, in the form of a solution of 6 moles of 20 weight percent sodium hydroxide per liter of solution. The second electrolytic bath is provided to tank 28 by fluid flow conduit 178 connected to caustic reactor 180 via valve 182. Reactor 180 mixes 50% by weight of sodium hydroxide with sufficient deionized water received from source 184 via valve 186 to provide the aforementioned concentration of the second electrolytic bath. Deionized water may also be provided directly to tank 28 via conduit 188 in order to permit adjustment of the composition of the second electrolytic bath should its concentration change during operation of the process.

The sodium hydroxide electrolytic bath is continuously recirculated by pump 190 via fluid flow conduit 192 through filter 194 and heater 196. Filter 194 is required in the aforementioned recirculation loop in order to remove particulate cadmium from the second electrolytic bath. Filtering prevents the particulate cadmium from plating onto the electrodes contained in tank 28. Heater 196 is effective to maintain the temperature of the second electrolytic bath of sodium hydroxide approximately within the range of about from 45 degrees C. to about 50 degrees C. Maintaining the temperature approximately within this range is important in order to control the discharge efficiency and hence the final state of charge of strip 12. A temperature in excess of this approximate range will result in greater discharge efficiency and a lower state of charge of strip 12. A higher temperature also increases evaporation of the bath and will adversely affect the strip 12. Similarly, a temperature below this approximate range will cause a lesser discharge efficiency and a higher state of charge of strip 12.

Electrochemical discharge tank 28 is provided with a pair of negatively polarized electrodes 198 immersed in the second electrolytic bath and spaced apart from each other to permit passage therebetween of strip 12. Each electrode 198 is negatively polarized by connection thereof with a source of negative polarization 200. As viewed in FIG. 3, strip 12 first passes vertically downward between the pair of electrodes 198 around rollers 202 and 204 and thence vertically upward. It has been found advantageous to provide a second pair of negatively polarized electrodes 206 also spaced apart to permit strip 12 to pass vertically upward therebetween. Similarly, electrodes 206 are each connected to a source of negative polarization 208. At the inlet to electrochemical discharge tank 28, strip 12 passes over electrical contact roller 210 whereby the strip 12 is positively polarized by virtue of the connection of roller 210 to a source of positive polarization 212. At the exit of tank 28, strip 12 passes over a second electrical contact roller 214 whereby the strip 12 is again positively polarized by virtue of the connection of roller 214 to a second source of positive polarization 216. In this manner, then, strip 12 is positively polarized at both the entrance and exit of tank 28. While this polarized strip 12, containing cadmium metal deposited thereon, is passed through the second electrolytic bath to effect oxidation of the cadmium metal.

As positively polarized strip 12 passes between negatively polarized electrode pair 198 and between negatively polarized electrode pair 206, at least a portion of the deposited cadmium particles on strip 12 are oxidized to cadmium hydroxide, $Cd(OH)_2$. Thus, the pure cadmium in the charged state is changed to an uncharged state. The degree to which the charged cadmium on the strip is converted to the uncharged state will vary in accordance with the residence time of the strip 12 in tank 28 and in accordance with the voltage and currents applied to electrodes 198 and 206 and strip 12 and in accordance with the temperature of the electrolytic bath. Since the process of the present invention operates continuously, the strip 12 passes through each step of the process at the same speed. Thus, the metallic strip 12 is passed through the first and second electrolytic baths at the same speed and in a continuous motion. The residence time of the strip 12 through the tank 28 is established by providing a tank 28 of sufficient size to contain electrode pairs 198 and 206 of sufficient length to achieve the desired amount of discharge of the cadmium particles on strip 12 at appropriate values of applied voltage and current. It has been found desirable to discharge the strip in tank 28 such that approximately from about 80% to about 20% of the original charge remains. That is to say, the strip is discharged until such time as from about 20% to about 80% of the pure cadmium has been converted to cadmium hydroxide $Cd(OH)_2$. Within this range, the discharged strip is particularly suited for assembly with a nickel positive electrode of a nickel cadmium rechargeable cell.

Figure 7:
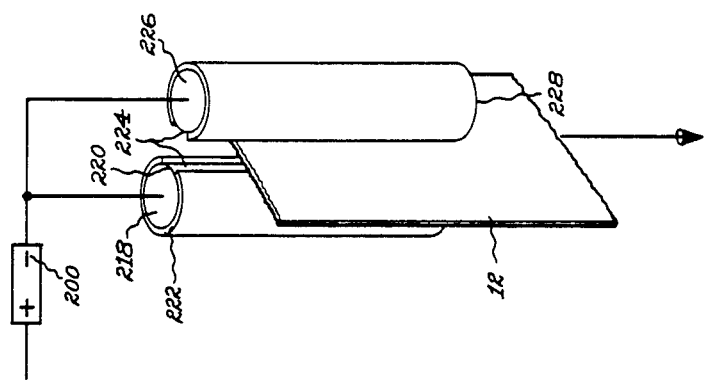
FIG. 7 is a perspective view of the negatively polarized electrodes depicted in FIG. 3.

Referring now to FIG. 7, there is schematically depicted a perspective view of the electrodes 206 of FIG. 3 between which strip 12 is arranged to pass to accomplish the aforementioned discharge of the active cadmium deposited metal. Electrodes 206, which are connected to a source of negative polarization, are comprised of a solid conductive metallic cylinder 218, such as steel. The outer cylindrical surface 220 of cylinder 218 is partially covered by a non-conductive insulator sleeve 222 in a manner to provide a surface 224 exposed to said electrolytic bath. Surface 224 is provided in the form of an elongated surface strip portion running the length of cylinder 206. Surface 224 is arranged such that it faces or confronts the center line of strip 12. For strips 12 having a width of between 8 and 12 inches, it is believed that a cylinder 218 having a diameter within the range of from approximately 1 to 3 inches and a length of from 20 to 30 inches are suitable to accomplish desired discharge of the cadmium metal adhered to strip 12 moving through tank 28 at a speed of 1 foot per minute with a voltage of approximately 6 to 7 volts and a current of approximately 1500 amps applied between strip 12 and electrodes 206. Generally speaking, in a continuous process the speed of strip 12 through electrodeposition tank 18 will determine the speed of strip 12 through tank 28. Thus, the size of tank 18 and electrodes 206 and 198 must be sufficient to provide ample residence time of strip 12 in tank 28 to achieve the desired discharge levels with the current available.

The configuration of electrodes 206 depicted in FIG. 7 provides a solution to a significant problem otherwise encountered in carrying out the electrochemical discharge of the cadmium metal particles adhered to the surfaces of moving strip 12. It is important that the degree or amount of electrochemical discharge of the cadmium metal to cadmium hydroxide be uniform throughout the surface of strip 12. This is necessary to ensure that each negative electrode cut from strip 12 will have the same state of charge to provide consistency and uniformity in the manufacture of rechargeable electrochemical cells. In other words, each cell made with a negative electrode cut from strip 12 must have the required state of charge between its positive and negative electrodes. Unfortunately, however, the strip 12 has sharp edges at its sides which concentrates the current at the edges of the strip during electrochemical discharge. This results in greater electrochemical discharge of the cadmium metal at the edges of the strip 12 than at its center. It is believed that the cause of this effect is the tendency of a portion of the surfaces of the negatively polarized electrode, which is not in substantially confronting relationship to the surfaces of strip 12, to concentrate current flux lines at the edges of strip 12.

By providing an electrode 206 constructed to present a narrow strip of surface area in current conducting relationship with the sodium hydroxide electrolyte and by aligning the electrodes along and in confronting relationship with the centerline of the moving strip 12, the tendency of greater electrochemical discharge to occur at the edges of strip 12 is for all practical purposes eliminated. It is believed that the insulator sleeve 222 prevents current flux lines, otherwise associated with that portion of the surface of cylinder 218 covered by insulator 222, from concentrating at the edges of strip 12. Said another way, current flux lines from the surfaces of cylinder 218 covered by insulator 222 are prevented from reaching any portion of the moving strip 12 including its edges. Thus, current is conducted out of electrode 206 only along the elongated surface strip 224 aligned along the centerline (the line parallel to and equidistant from the edges of strip 12) of the strip 12.

It is also noteworthy that the configuration of electrode 206 wherein the cylinder 218 is partially surrounded by sleeve 222 permits a large diameter electrode to be used in tank 28. A large diameter configuration is advantageous since it decreases the resistance to the flow of current from the cylinder end 226 (the end connected to negative polarization source 200) to the cylinder end 228. Accordingly, current flow out of surface 224 near end 226 may be made nearly equal to the current flow out of surface 224 near end 228. That is to say, the current flow from surface 224 to strip 12 is nearly constant along the length of cylinder 218 which results in maximum efficiency of the electrochemical discharge step of the process comprising the present invention. While a very small diameter electrode might overcome some of the aforementioned variations in electrochemical discharge at the edges of strip 12, a very small diameter electrode would result in process inefficiencies due to the substantial increase in resistance along the length of the electrode. That is to say, with a very small diameter electrode, the electrode-to-strip current at end 228 would be substantially less than the electrode-to-strip current at end 226.

Electrochemically discharging the strip 12 by passage through the sodium hydroxide bath contained in tank 28 permits electrodes made from strip 12 to be matched in stage of charge to that of a positive nickel electrode in a nickel-cadmium rechargeable cell. The cell may be immediately closed or sealed without intervening charging and discharging of the cell and without the addition of water to compensate for water lost from the cell electrolyte. In other words, without electrochemical discharge as taught herein, prior art techniques require charging and discharging of the cell after cell assembly but before cell closing. In turn this requires the replenishment of water lost from the electrolyte. Charging, discharging and water replenishment before cell closing is time-consuming and expensive. Electrochemical discharge of the electrodeposited electrode in accordance with the present invention eliminates these costly and time consuming cell assembly steps.

Referring again to FIG. 3, strip 12, after emerging from electrochemical discharge tank 28 contains droplets of the sodium hydroxide from electrochemical discharge tank 28. These droplets must be removed and for this purpose strip 12 is directed toward tank 29 comprising a cascade deionized water wash tank. Tank 29 is comprised of a plurality of compartments 230a, 230b, 230c and 230d each containing a guide roller 232 for redirecting the orientation of strip 12. Deionized water is directed from source 184 through fluid flow conduit 234, through heater 236 and past valve 238 to compartment 230a of tank 29. Compartment 230b is disposed immediately adjacent to compartment 230a and is separated therefrom by a common wall 240. Compartment 230c is disposed immediately adjacent compartment 230b and is separated therefrom by a common wall 242. Common wall 242 is of lesser height than common wall 240 such that the height or level of the water in compartment 230b is less than the height of water in compartment 230a. Accordingly, with compartment 230a filled with water, the additional supply of water to compartment 230a via conduit 234 will result in the overflow of water from compartment 230a, past or over the top of common wall 240 and into compartment 230b. The overflow of water over wall 240 into compartment 230b will cause an overflow of water from compartment 230b, past or over the top of common wall 242 and into compartment 230c. In a similar manner, overflow of water from compartment 230c will be directed to compartment 230d which is disposed immediately adjacent compartment 230c and separated therefrom by common wall 244 which is of lesser height than common wall 242. Thus, tank 29 is comprised of a cascade wash in which deionized wash water sequentially passes from compartment 230a to compartment 230b to compartment 230c to compartment 230d and thence to drain via fluid flow conduit 246.

Strip 12 is first directed into compartment 230d wherein it is washed by the water contained therein. Upon emergence from compartment 230d it is sequentially directed by guide rollers 248, 250 and 252 through compartments 230c, 230b and 230a, respectively, whereby it is washed by the water contained in each compartment. It is observed that the direction of travel of strip 12 from compartment to compartment is opposite to the flow of water from compartment to compartment. As water flows sequentially through compartment 230, compartment 230b, compartment 230c and compartment 230d, it becomes progressively dirtier due to progressive washing of strip 12. Hence strip 12 first is first washed in the dirtiest water in compartment 230d but is last washed by clean water in compartment 230a. Reuse of water in this cascading counterflow wash system permits strip 12 to be washed with a minimum of water. Upon emergence from wash tank 29, strip 12 is passed through dryer 30 which removes any water which may have adhered to the surface of strip 12.

Figure 4:
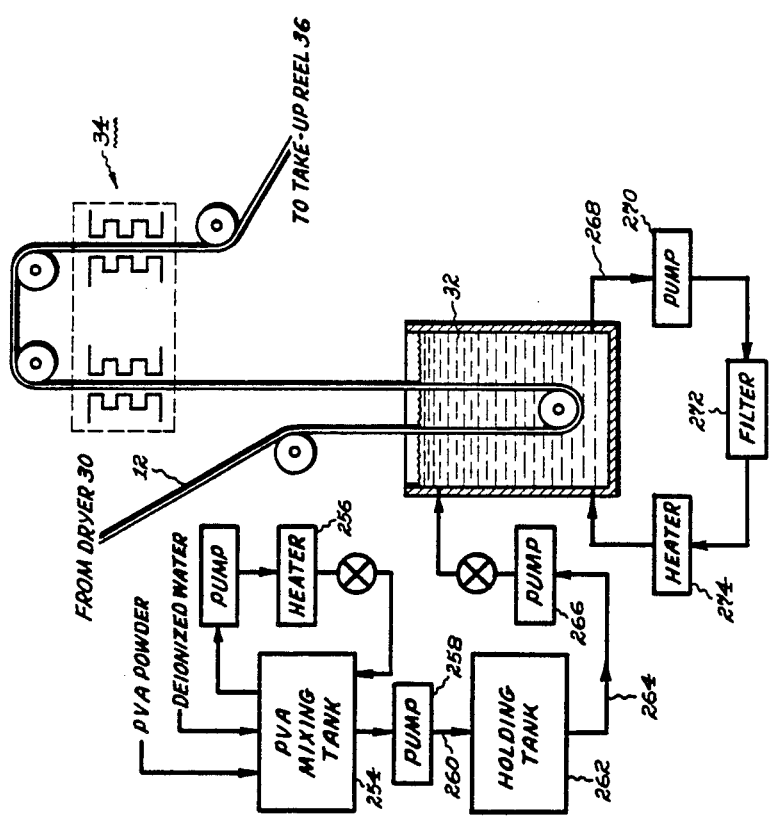
FIG. 4 is a schematic diagram of apparatus useful in carrying out process steps subsequent to those depicted in FIG. 3.

Referring now to FIG. 4, strip 12 is directed from dryer 30 to coating tank 32 for the purpose of applying a thin non-conductive coating in the form of a polyvinyl alcohol binder solution to the cadmium and cadmium hydroxide material adhered to the surfaces of strip 12. The non-conductive binder solution, after drying, improves the adherence of the cadmium and cadmium hydroxide material to the strip 12. Accordingly, electrodes cut from strip 12 may be more readily wound into electrode assemblies for use in rechargeable nickel cadmium cells without portions of the deposited material failing off of the electrode during the winding step or during the subsequent insertion of the would electrode assembly into the cell container. The application of the non-conductive coating is also believed to serve as a barrier preventing cadmium migration during charge and discharge of the rechargeable electrochemical cell.

The polyvinylalcohol solution is prepared in mixing tank 254 by combining appropriate amounts of polyvinylalcohol powder with deionized water to produce a solution having approximately 0.1 to 2% by weight of polyvinylalcohol. Mixing is achieved by adding polyvinylalcohol to cold water (22° C.) and then slowly heating, by heater 256, the water to approximately 85 degrees C. over a period of time of approximately 2 hours. The mixed solution is pumped by pump 258 to holding tank 262 via fluid flow conduit 260. Upon demand, the polyvinylalcohol solution is fed via conduit 264 and pump 266 to coating tank 32.

Coating tank 32 is provided with a fluid circulation loop comprised of fluid flow conduit 268, pump 270, filter 272 and heater 274. Filter 272 removes any particulate cadmium particles that may have entered the polyvinylalcohol solution from strip 12 while heater 274 maintains the polyvinylalcohol solution at a temperature of within the range of approximately 35 degrees C. to 45 degrees C.

As strip 12 moves through the solution within tank 32, the solution coats the surface of the deposited cadmium particles and partially infiltrates the pores residing between the particles. Thus, upon emergence from tank 32, the strip 12 includes a thin coating of solution covering the deposited cadmium particles adhered on the surface of strip 12. Thereafter, passage of the strip 12 through dryer 34 removes the water from the solution leaving a coating of dried polyvinylalcohol on the cadmium particles and in the pores therebetween.

As an example of the practice of teachings heretofore described, a negative electrode was manufactured by electrodeposition of cadmium on a metallic substrate, assembled into a Cs electrochemical cell containing a standard nickel positive electrode and then tested. More specifically, a strip of nickel coated steel 0.1 mm in thickness, 31.5 mm in width was first passed through an etchant bath containing a 1.1 normal solution of sulfuric acid. The path length along which the strip traveled through the etchant bath was 60.9 cm. The strip traveled at a continuous speed of 10 cm/min through the etchant bath which was recirculated through the etchant tank at a flow rate of 4.6 liters per minute and was maintained at an average temperature of approximately 9° C.

After passing through the etchant bath, the etched metallic strip was passed through an electrodeposition tank containing an electrolytic bath comprising a 1.1 normal concentration of sulfuric acid, a 0.175 molar concentration of cadmium sulfate and a 0.0085 molar concentration of nickel sulfate. The electrolytic bath was maintained at a temperature of approximately 8.8° C. and was recirculated at a rate of 4.6 liters per minute. The strip traveled through the electrolytic bath at a speed of approximately 10 cm/min along a path length of approximately 60.9 cm. The cathodic current applied to and flowing through the strip was set at 177 amps. The anodic current through the active cadmium anode was approximately 133 amps while the anodic current through the inactive anode was 44 amps. The strip to active anode voltage was maintained at 11.94 volts while the strip to inactive anode voltage was maintained at 11.97 volts. Upon emergence from the electrolytic bath the strip with deposited cadmium adhered thereto was densified or calendared to a thickness of approximately 0.63 mm and thereafter dried and passed at a speed of 10 cm/min through an impregnation tank containing a 0.5 molar solution of nickel sulfate as previously described. The temperature of the nickel sulfate solution was maintained at approximately 25° C. The length of the path along which the strip moved through the nickel sulfate was again 60.9 cm in length. After emerging from the nickel sulfate impregnation solution the strip was dried and again densified or compacted to a thickness of approximately 0.55 mm.

The densified strip was then passed through a second electrolytic bath of 6 normal sodium hydroxide at a speed of 27 cm/min and electrochemically discharged to convert a portion of the cadmium on the strip into cadmium hydroxide. The path length along which the strip passed through the sodium hydroxide was approximately 137 cm. The temperature of the sodium hydroxide was maintained approximately at 48° C.

Thereafter the strip was washed in a deionized water cascade, dried and passed through a 0.7% polyvinylalcohol solution having a temperature of 25° C. The strip was passed through the polyvinylalcohol solution at a speed of 27 cm/min along a path 60.9 cm in length.

From the strip of electrode material, an electrode segment 218 mm in length was cut and assembled with a nickel positive electrode into a Cs size cell assembly. The positive nickel electrode was 0.76 mm thick, 185 mm long and had an active width of 29.66 mm. In the cell assembly, the outer wrap of separator material, conventionally placed between the outer turn of negative electrode and the cell container, was eliminated. Elimination of the outer wrap of separator was possible since the improved mechanical integrity of the negative electrode permitted the insertion of the electrode assembly into the cell container without scraping-off of the active material from the negative electrode. Elimination of the outer wrap of separator material permitted more active material to be placed in the cell. The cell assembly was then discharged at a rate of 1200 milliamperes until the cell voltage reached 1 volt. The capacity delivered by the cell during the discharge was measured at 1670 milliampere-hours. This compares extremely favorably with 1340 milliampere-hours of capacity measured under the same charge and discharge conditions as delivered by a commercially available high-capacity Cs cell having a standard electrode of pasted construction known in the art. Thus, an electrode manufactured in accordance with the teachings set forth herein delivers approximately 25% more capacity than a commercially available standard Cs cell having a pasted negative electrode. The improvement in energy capacity provided by a cell having an electrodeposited negative electrode made in accordance with the teachings hereof is attributed to both an improvement in electrode integrity and to the increased energy density of the improved electrode. As previously stated, improved mechanical integrity of the negative electrode permits the elimination of the outer wrap of separator material and the inclusion of additional active material thus increasing the capacity of the cell. Improved energy density is achieved primarily by use of an electrolytic bath of the composition specified herein which results in cadmium deposits having a fern-like structure offering a high surface area to volume ratio which in turn enables high utilization of the cadmium during charging and discharging of the cell. Furthermore, the electrochemical discharge of the electro-deposited negative electrode facilitates assembly of the negative electrode with a positive nickel electrode under conditions where the state of charge of the electrodes are matched in a predetermined relationship. Thus, a nickel-cadmium cell having a partially discharged electrodeposited negative electrode may readily be assembled into an electrochemical cell and the cell may be closed or sealed without time-consuming and costly process steps known in the prior art. As previously described the present process also provides an electrode of excellent structural integrity well adapted to withstand rigorous handling during assembly.

While the preferred embodiments of the present invention have been fully described in order to adequately explain the principles of the invention, it is understood that various modifications or alterations or other embodiments may be utilized without departing from the scope of the appended claims.

We claim:

1. A process for manufacturing an electrode for a rechargeable electrochemical cell containing an electrolyte by electrodepositing a metal on the surface of a continous metallic strip, said process comprising the steps of:

providing an etchant tank containing an etchant for removing contaminants from said surface of said continuous metallic strip;

passing said continuous metallic strip while negatively polarized through said etchant tank prior to passing said metallic strip through a first electrolytic bath to remove said contaminants on said surfae of said metallic strip prior to said electrodeposition step;

providing a first tank containing an electrolytic bath containing ions of the metal to be deposited;

immersing in said first electrolytic bath a positively polarized electrode comprising the metal to be deposited on said metallic strip;

negatively polarizing said metallic strip;

passing said metallic strip while negatively polarized through said tank and through said first electrolytic bath to effect deposition of said metal on said metallic strip;

providing a second tank containing a second electrolytic bath;

immersing in said second electrolytic bath a second negatively polarized electrode;

positively polarizing said metallic strip containing said deposited metal after emergence from said first tank, and passing said positively polarized metallic strip containing said deposited metal through said second electrolytic bath to effect oxidation of said deposited metal.

2. The invention as set forth in claim 1 wherein said deposited metal is comprised of cadmium and the step of passing said positive polarized metallic strip through said second electrolytic bath oxidizes from about 20 to 80% of said deposited cadmium metal to cadmium oxide.

3. The invention as set forth in claim 1 wherein said metallic strip is passed through said first and second electrolytic baths in a continuous motion.

4. The invention as set forth in claim 3 wherein said metallic strip is passed through said first and second electrolytic baths at the same speed.

5. The invention as set forth in claim 1 wherein said first electrolytic bath is comprised of a solution comprised of sulfuric acid and cadmium sulfate.

6. The invention as set forth in claim 5 wherein said first electrolytic bath solution is further comprised of nickel sulfate.

7. The invention as set forth in claim 6 wherein the ratio of cadmium to nickel in said solution is approximately within the range of from about 12 to 1 by weight to about 337 to 1 by weight.

8. The invention as set forth in claim 7 wherein the pH of said solution is in the acidic range.

9. The invention as set forth in claim 8 wherein the pH of said solution is within the range of from about −1 to about 4.

10. The invention as set forth in claim 9 wherein the pH of said solution is within the range of about a −0.2 to 0.1.

11. The invention as set forth in claim 6 wherein the pH of said solution is in the acidic range.

12. The invention as set forth in claim 11 wherein the pH of said solution is within the range of from about −1 to about 4.

13. The invention as set forth in claim 12 wherein the pH of said solution is within the range of from about −0.2 to 0.1.

14. The invention as set forth in claim 12 further comprising the step of providing means for cooling of said etchant.

15. The invention as set forth in claim 12 further comprising the step of providing means for removing said contaminants from said etchant.

16. The invention as set forth in claim 1 wherein said negatively polarizing step includes the step of simultaneously negatively polarizing said continuous metallic strip at a first location proximate where said strip passes into said first electrolytic bath and at a second location disposed after said continuous strip passes out of said electrolytic bath.

17. The invention as set forth in claim 1 further comprising the steps of:
compacting said deposited metal on said metallic strip; and
coating said compacted deposited metal strip with a thin non-conductive material permeable to said cell electrolyte.

18. The invention as set forth in claim 17 wherein said coating strip includes the step of coating said deposited metal with a solution containing said non-conductive material and then drying said coated deposited metal.

19. The invention as set forth in claim 18 wherein said coating step includes the step of coating said deposited metal with a thin coating of a solution comprising polyvinylalcohol and then drying said coated deposited metal.

20. The invention as set forth in claim 1 further comprising the steps of:
providing in said first electrolytic bath an inactive anode comprised of a noble metal; and
positively polarizing said inactive anode.

21. The invention as set forth in claim 20 said inactive anode includes a surface thereof plated with platinum.

22. The invention as set forth in claim 20 wherein said inactive anode is comprised of titanium.

23. A process for manufacturing an electrode for a rechargeable electrochemical cell by electrodepositing a metal on the surfaces of a continuous metallic strip, said process comprising:
providing an etchant tank containing an etchant for removing contaminants from said surfaces of said continuous metallic strip;
passing said continuous strip through said etchant to effect removal of said contaminants from said surfaces of said metallic strip and into said etchant;
providing an electrodeposition tank containing an electrolytic bath containing ions of the metal to be deposited;
immersing in said electrolytic bath a positively polarized electrode comprising the metal to be deposited on said metallic strip;
negatively polarizing said metallic strip;
passing said metallic strip while negatively polarized through said tank and said electrolytic bath to effect deposition of said metal on said metallic strip, said electrodeposition step effected after said contaminant removal step;
providing means for removing said contaminants from said etchant; and
providing means for continuously recirculating said etchant between said etchant tank and said contaminant removal means.

24. The invention as set forth in claim 23 further comprising the step of providing means for cooling said etchant.

25. The invention as set forth in claim 24 wherein said step of providing cooling means includes the step of providing heat exchanger means and said recirculating step includes the step of recirculating said etchant between said etchant tank and said heat exchanger.

26. The invention as set forth in claim 21 wherein said step of providing means for removing said contaminants from said etchant includes the step of immersing electrodes in said etchant.

27. The invention as set forth in claim 21 wherein said contaminant removal step includes the step of providing a second positively polarized electrode and a second negative polarized electrode and the step of recirculating said etchant past said second positively polarized electrode and said second negatively polarized electrode to remove said contaminants from said etchant.

28. The invention as set forth in claim 23 wherein said deposited metal is cadmium.

29. The invention as set forth in claim 28 further comprising the steps of:
positively polarizing said metallic strip after emergence from said electrodeposition tank;
passing said positively polarized metallic strip with said cadmium metal deposited thereon through a second electrolytic bath containing a negatively polarized electrode to effect oxidation of said deposited cadmium metal to cadmium oxide.

30. The invention as set forth in claim 29 wherein said metallic strip is passed through said first and second electrolytic baths in a continuous motion.

31. The invention as set forth in claim 30 wherein said metallic strip is passed through said first and second electrolytic baths at the same speed.

32. The invention as set forth in claim 28 wherein said electrolytic bath is comprised of a solution of sulfuric acid, cadmium sulfate and nickel sulfate 33. The invention as set forth in claim 28 wherein said negatively polarizing step includes the step of simultaneously negatively polarizing said continuous strip at a first location proximate where said continuous metallic strip passes into said etchant tank and at a second location disposed after said continuous strip passes out of said electrodeposition tank.

34. The invention as set forth in claim 28 further comprising the steps of:

compacting said deposited metal on said metallic strip; and coating said compacted deposited metal with a nonconductive material permeable by said cell electrolyte.

35. The invention as set forth in claim 34 wherein said coating step includes the step of coating said deposited metal with a thin coating of a solution and then drying said coated deposited metal.

36. The invention as set forth in claim 35 wherein said coating step includes the step of coating said deposited metal with a thin coating of a solution comprising polyvinylalcohol and then drying said coated deposited metal.

37. The invention as set forth in claim 28 further comprising the steps of:
providing an inactive anode in said first electrolytic bath, said anode comprised of a noble metal; and
positively polarizing said inactive anode.

38. The invention as set forth in claim 37 wherein said inactive anode a portion thereof plated with platinum.

39. The invention as set forth in claim 23 further comprising the steps of:
providing fluid flow communication means between etchant tank and said electrodeposition tank; and
providing for a continuous flow of said etchant from said etchant tank to said electrodeposition tank.

40. The invention as set forth in claim 39 wherein said step of providing fluid flow communication means includes the step of providing an entrance slot in said electrodeposition tank through which said metallic strip may enter said electrodeposition tank after passing through said etchant tank.

41. The invention as set forth in claim 40 wherein said step of providing for a continuous flow includes the step of providing a fluid head in said etchant tank greater than the fluid head of the electrolytic bath in said electrodeposition tank.

42. For use in an electrochemical cell, an electrode made by the process of claim 23.

43. The invention of claim 42 wherein said electrode is comprised of cadmium.

44. The process of claim 23 wherein said first electrolytic bath contains a positively polarized inactive anode comprised of a noble metal.

45. The process of claim 33 wherein said inactive anode includes a first surface coated with a non-conductive coating to prevent the conduction of current between said coated first surface and said electrolytic bath.

46. The process of claim 45 wherein said inactive anode includes a second surface covered with a thin layer of a metal relatively chemically inactive with said electrolytic bath.

47. The process of claim 46 wherein said thin layer is comprised of platinum.

48. The process of claim 47 wherein said inactive anode is comprised of titanium.

49. A process for manufacturing an electrode for a rechargeable electrochemical cell containing an electrode by electrodepositing a metal on the surfaces of a continuous metallic strip, said process comprising the steps of:
providing a first tank containing a first electrolytic bath containing ions of the metal to be deposited;
immersing in said first electrolytic bath a positively polarized electrode comprising the metal to be deposited on said metallic strip;
passing said continuous metallic strip into, through and out of said first electrolytic bath;
simultaneously negatively polarizing said continuous metallic strip at a first location proximate where said strip passes into said first electrolytic bath and at a second location disposed after said continuous strip passes out of said electrolytic bath whereby the strip is negatively polarized while passing through said electrolytic bath and the deposition of said metal on said continuous metal strip is effected by said negative polarization of said strip at each of said first and second locations; and
compacting said metallic strip with said metal deposited thereon at a third location disposed between said first and second locations.

50. The invention as set forth in claim 49 further comprising the steps of:
providing an etchant tank containing an etchant for removing contaminants from the surfaces of said metallic strip;
passing said metallic strip through said etchant to effect removal of said contaminants from said metallic strip;
providing a second tank containing a second electrolytic bath;
immersing in said second electrolytic bath a second negatively polarized electrode;
positively polarizing said continuous metallic strip containing said deposited metal after said second location; and
passing said positively polarized metallic strip containing said deposited metal through said second electrolytic bath to effect oxidation of said deposited metal.

51. The invention as set forth in claim 50 wherein said deposited metal is cadmium and the step of passing said positively polarized metallic strip oxidizes from about 20% to 80% of said deposited cadmium metal to cadmium hydroxide.

52. The invention as set forth in claim 51 wherein said metallic strip is passed through said first and second electrolytic baths in a continuous motion.

53. The invention as set forth in claim 52 wherein said metallic strip is passed through said first and second electrolytic baths at the same speed.

54. The invention as set forth in claim 50 wherein said first electrolytic bath is comprised of sulfuric acid, cadmium sulfate and nickel sulfate and said second electrolytic bath is comprised of sodium hydroxide.

55. The invention as set forth in claim 49 further comprising the steps of:
compacting said deposited metal on said metallic strip after emergence of said strip from said first electrolytic bath; and
coating said compacted deposited metal strip with a material permeable to said cell electrolyte.

56. The invention as set forth in claim 55 wherein said coating step includes the step of coating said deposited metal with a non-conductive material permeable to said cell electrolyte.

57. The invention as set forth in claim 56 wherein said coating step includes the step of coating said deposited metal with a thin coating of a solution comprising polyvinylalcohol and then drying said coated deposited metal.

58. The invention as set forth in claim 49 further comprising the steps of:

providing an inactive anode comprised of a noble metal in said first electrolytic bath; and positively polarizing said inactive anode.

59. The invention as set forth in claim 58 wherein said inactive electrode is comprised of titanium.

60. The invention as set forth in claim 59 wherein said inactive anode includes a portion thereof plated with platinum.

61. For use in an electrochemical cell, an electrode made by the process of claim 49.

62. The invention of claim 61 wherein said electrode is comprised of cadmium.

63. A process for manufacturing an electrode for a rechargeable electrochemical cell containing an electrolyte by electrodepositing a metal on the surfaces of a continuous metallic strip, said process comprising the steps of:

providing an electrodeposition tank containing a first electrolytic bath containing ions of the metal to be deposited;

immersing in said electrolytic bath a positively polarized electrode comprising the metal to be deposited on said metallic strip;

negatively polarizing said metallic strip;

passing said metallic strip while negatively polarized through said tank and through said electrolytic bath to effect deposition of said metal on said metallic strip;

compacting said deposited metal on said metallic strip; and thereafter coating said compacted deposited metal on said metallic strip with a non-conductive material permeable to said cell electrolyte and adapted to prevent migration of said deposited metal away from said metallic strip during discharging and charging of said rechargeable electrochemical cell.

64. The invention as set forth in claim 63 wherein said coating step includes the step of coating said deposited metal with a thin coating of a solution containing said non-conductive material and drying said coated deposited metal.

65. The invention as set forth in claim 64 wherein said coating step includes the step of coating said deposited metal with a thin coating of a solution comprising polyvinylalcohol and then drying said coated deposited metal.

66. The invention as set forth in claim 63 wherein said coating step includes the step of coating said deposited metal with a coating of a non-conductive material.

67. The invention as set forth in claim 66 further comprising the step of drying said metallic strip with said non-conductive material coated thereon.

68. The invention as set forth in claim 63 further comprising the steps of:

providing an etchant tank containing an etchant for removing contaminants from the surfaces of said metallic strip;

passing said metallic strip through said etchant for removing contaminants from said surfaces of said metallic strip;

providing a second tank containing a second electrolytic bath;

immersing in said second electrolytic bath a negatively polarized electrode;

positively polarizing said metallic containing said deposited metal after said strip has emerged from said electrodeposition tank; and passing said positively polarized metallic strip through said second electrolytic bath to effect oxidation of said deposited metal.

69. The invention as set forth in claim 68 wherein said deposited metal is cadmium and the step of passing said positively polarized metallic strip oxidizes from about 20% to 80% of said deposited cadmium metal to cadmium oxide.

70. The invention as set forth in claim 69 wherein said metallic strip is passed through said first and second electrolytic baths in a continuous motion.

71. The invention as set forth in claim 69 wherein said metallic strip is passed through said first and second electrolytic baths at the same speed.

72. The invention as set forth in claim 68 wherein said first electrolytic bath is comprised of sulfuric acid, cadmium sulfate and nickel sulfate and said second electrolytic bath is comprised of sodium hydroxide.

73. For use in an electrochemical cell, an electrode made by the process of claim 52.

74. The invention of claim 73 wherein said electrode is comprised of cadmium.

75. The invention of claim 74 wherein said coating is comprised of a non-conductive coating.

76. The invention of claim 75 wherein said non-conductive coating is comprised of polyvinylalcohol.

77. A process for manufacturing an electrode for a rechargeable electrochemical cell containing an electrolyte, said process comprising the steps of:

providing an electrically conductive metallic substrate;

adhering a chemically active material to said substrate, said active material adapted to oxidize and reduce during charging and discharging of said cell; and then coating said active material with a thin layer of a polyvinylalcohol permeable to said cell electrolyte and adapted to prevent migration of said active material away from said metallic substrate during discharging and charging of said rechargeable electrochemical cell.

78. The invention as set forth in claim 77 wherein said coating step includes the step of coating said active material with a solution containing said polyvinylalcohol and drying said coated active material.

79. The invention as set forth in claim 78 wherein said coating step includes the step of coating said active material with a thin layer of a mixture comprising from about .1% to about 2% by weight of polyvinylalcohol and then drying said coated active material 80. An electrode made by a process of electrodepositing a metal on the surface of a continuous metallic strip, said process comprising the steps of:

providing a first tank containing an etchant for removing contaminants from said surface of said continuous metallic strip;

passing said continuous metallic strip while negatively polarized through said etchant tank prior to passing said metallic strip through a first electrolytic bath to remove said contaminants on said surfaces of said metallic strip prior to said deposition step;

providing a second tank containing an electrolytic bath which contains ions of the metal to be deposited;

immersing in said first electrolytic bath a positively polarized electrode comprising the metal to be deposited on said metallic strip;

negatively polarizing said metallic strip;

passing said metallic strip while negatively polarized through said second tank and through said first electrolytic bath to effect deposition of said metal on said metallic strip;

providing a third tank containing a second electrolytic bath;

immersing in said second electrolytic bath a second negatively polarized electrode;

positively polarizing said metallic strip containing said deposited metal after emergence from said second tank, and passing said positively polarized metallic strip containing said deposited metal through said second electrolytic bath to effect oxidation of said deposited metal.

81. The invention of claim 80 wherein said electrode is comprised of cadmium.

82. The invention of claim 81 wherein said electrode is comprised of cadmium and cadmium hydroxide.

83. The invention of claim 87 wherein said electrode is comprised of from about 20% to about 100% cadmium and from about 0% to 80% cadmium hydroxide.

* * * * *